United States Patent
Frey

(10) Patent No.: US 9,423,525 B2
(45) Date of Patent: Aug. 23, 2016

(54) GAIN COMPENSATED DIRECTIONAL PROPAGATION MEASUREMENTS

(71) Applicant: Schlumberger Technology Corporation, Sugar Land, TX (US)

(72) Inventor: Mark Frey, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/325,605

(22) Filed: Jul. 8, 2014

(65) Prior Publication Data

US 2015/0276971 A1    Oct. 1, 2015

Related U.S. Application Data

(60) Provisional application No. 61/972,287, filed on Mar. 29, 2014, provisional application No. 61/972,288, filed on Mar. 29, 2014, provisional application No. 61/972,289, filed on Mar. 29, 2014, provisional application No. 61/972,290, filed on Mar. 29, 2014.

(51) Int. Cl.
*G01V 3/12* (2006.01)
*G01V 3/38* (2006.01)
*G01V 3/18* (2006.01)
(Continued)

(52) U.S. Cl.
CPC .. *G01V 3/38* (2013.01); *G01V 3/18* (2013.01); *G01V 3/28* (2013.01); *G01V 3/30* (2013.01)

(58) Field of Classification Search
CPC .............. G01V 3/30; G01V 3/38; G01V 3/28

USPC .................................................. 324/338, 343
See application file for complete search history.

(56) References Cited

U.S. PATENT DOCUMENTS

| 5,594,343 A | 1/1997 | Clark et al. |
| 5,757,191 A | 5/1998 | Gianzero |
| 6,819,111 B2 | 11/2004 | Fanini et al. |

(Continued)

FOREIGN PATENT DOCUMENTS

| WO | 2009009342 A1 | 1/2009 |
| WO | WO2014003701 | 1/2014 |

(Continued)

OTHER PUBLICATIONS

Frey, et al., "A Retrievable and Reseatable Propagation Resistivity Tool for Logging While Drilling and Logging While Tripping", SPE ATCE, San Antonio, TX, SPE 103066, Sep. 24-27, 2006.

(Continued)

*Primary Examiner* — Reena Aurora
(74) *Attorney, Agent, or Firm* — John Vereb

(57) ABSTRACT

A method for obtaining gain compensated propagation measurements includes rotating an electromagnetic logging while drilling tool having at least one axial transmitter antenna, at least one transverse transmitter antenna, at least one axial receiver antenna and at least one transverse receiver antenna in a subterranean wellbore. Electromagnetic voltage measurements are acquired from the axial and transverse receiver antennas while rotating. The acquired voltage measurements are processed to compute harmonic voltage coefficients. Ratios of selected ones of the harmonic voltage coefficients are in turn processed to compute at least one gain compensated quantity including an axial cross term.

22 Claims, 9 Drawing Sheets

(51) Int. Cl.
  *G01V 3/30* (2006.01)
  *G01V 3/28* (2006.01)

(56) References Cited

U.S. PATENT DOCUMENTS

| | | |
|---|---|---|
| 6,911,824 B2 | 6/2005 | Bittar |
| 6,969,994 B2 | 11/2005 | Minerbo et al. |
| 7,382,135 B2 * | 6/2008 | Li .................. G01V 3/30 324/338 |
| 7,536,261 B2 | 5/2009 | Omeragic et al. |
| 7,548,887 B1 * | 6/2009 | Ogino .............. G06Q 30/0185 380/259 |
| 7,915,895 B2 | 3/2011 | Chemali et al. |
| 7,990,153 B2 | 8/2011 | Streinz et al. |
| 7,991,555 B2 | 8/2011 | Yang et al. |
| 8,274,289 B2 | 9/2012 | Bittar et al. |
| 8,368,403 B2 | 2/2013 | Homan et al. |
| 8,407,005 B2 * | 3/2013 | Zhdanov ............ G01V 3/28 702/6 |
| 8,466,683 B2 | 6/2013 | Legendre et al. |
| 2007/0024286 A1 | 2/2007 | Wang |
| 2008/0078550 A1 | 4/2008 | Chatterji et al. |
| 2008/0143336 A1 | 6/2008 | Legendre et al. |
| 2011/0074427 A1 | 3/2011 | Wang et al. |
| 2011/0238312 A1 | 9/2011 | Seydoux et al. |
| 2011/0291855 A1 | 12/2011 | Homan et al. |
| 2012/0105076 A1 | 5/2012 | Li et al. |
| 2012/0166086 A1 | 6/2012 | Zhong et al. |
| 2012/0242342 A1 | 9/2012 | Rabinovich et al. |
| 2013/0035862 A1 | 2/2013 | Fang et al. |
| 2013/0141104 A1 | 6/2013 | Homan et al. |
| 2013/0191028 A1 | 7/2013 | Homan et al. |
| 2013/0301388 A1 | 11/2013 | Hartmann et al. |
| 2013/0304384 A1 | 11/2013 | Rabinovich et al. |

FOREIGN PATENT DOCUMENTS

| | | |
|---|---|---|
| WO | WO2014003702 | 1/2014 |
| WO | 2015027010 A1 | 2/2015 |
| WO | 20151027002 A1 | 2/2015 |
| WO | 2015153303 A1 | 10/2015 |

OTHER PUBLICATIONS

International Search Report and Written Opinion issued in PCT/US2015/022736 on Jun. 26, 2015, 10 pages.

* cited by examiner

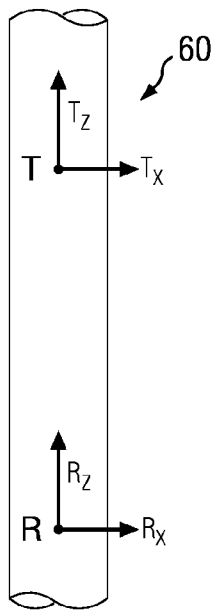 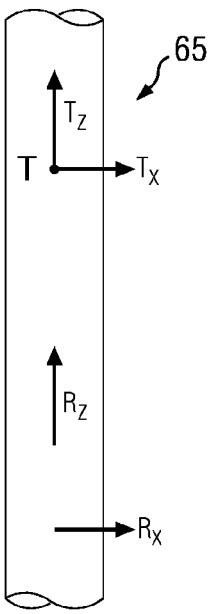 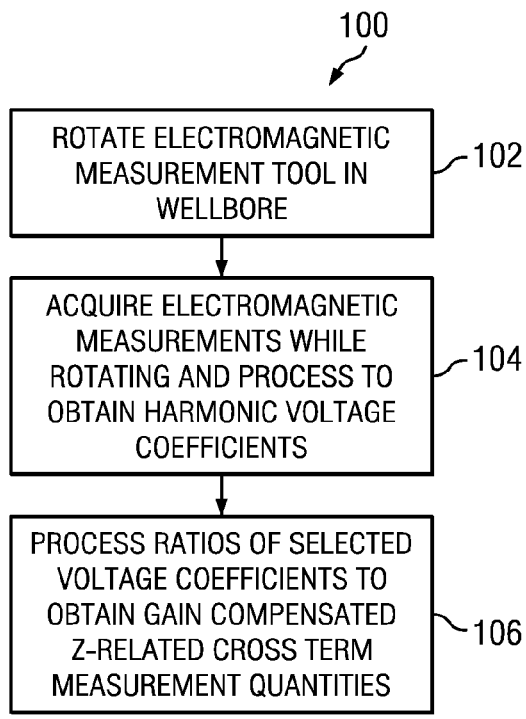
FIG. 3A  FIG. 3B  FIG. 4
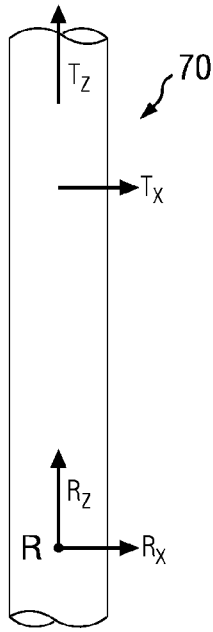 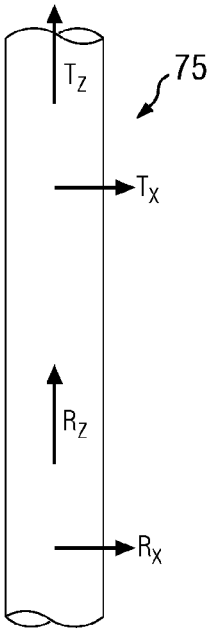 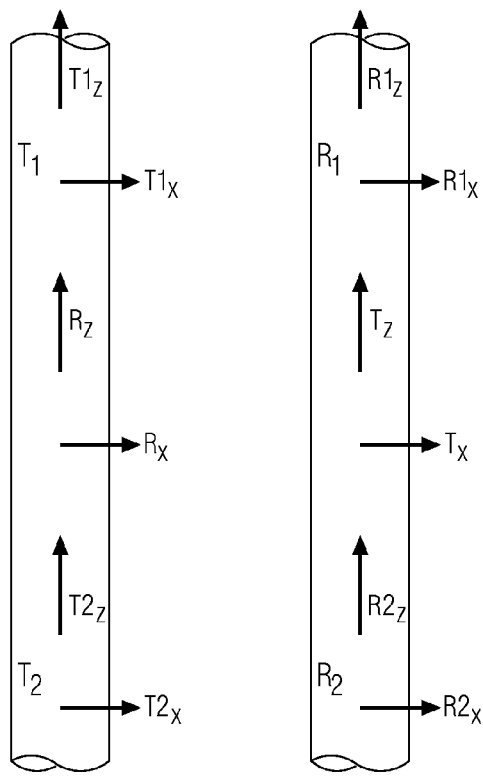
FIG. 3C  FIG. 3D  FIG. 5A  FIG. 5B

US 9,423,525 B2

GAIN COMPENSATED DIRECTIONAL PROPAGATION MEASUREMENTS

CROSS REFERENCE TO RELATED APPLICATIONS

This application claims the benefit of the following four U.S. Provisional patent applications (each of which was filed on Mar. 29, 2014): (i) Ser. No. 61/972,287 entitled Fully Gain Compensated Tensor Propagation Cross-Term Measurements with Orthogonal Antennas, (ii) Ser. No. 61/972,288 entitled Improved Symmetrized and Anti-symmetrized Measurements with Orthogonal Antennas, (iii) Ser. No. 61/972,289 entitled Compensated Directional Measurements using Tilted Moments that are Independent of Tilt Angle Parameter, and (iv) Ser. No. 61/972,290 entitled Compensated Array Configurations with Orthogonal Antennas.

FIELD OF THE DISCLOSURE

Disclosed embodiments relate generally to downhole electromagnetic logging methods and more particularly to a logging tool and a method for making gain compensated directional propagation measurements, such as phase shift and attenuation measurements, using orthogonal antennas.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Downhole electromagnetic measurements are commonly inverted at the surface using a formation model to obtain various formation parameters, for example, including vertical resistivity, horizontal resistivity, distance to a remote bed, resistivity of the remote bed, dip angle, and the like. One challenge in utilizing directional electromagnetic resistivity measurements, is obtaining a sufficient quantity of data to perform a reliable inversion. The actual formation structure is frequently significantly more complex than the formation models used in the inversion. The use of a three-dimensional matrix of propagation measurements may enable a full three-dimensional measurement of the formation properties to be obtained as well as improve formation imaging and electromagnetic look ahead measurements. However, there are no known methods for providing a fully gain compensated triaxial propagation measurement.

SUMMARY

A method for obtaining gain compensated electromagnetic logging while drilling propagation measurements is disclosed. An electromagnetic logging while drilling tool having at least one axial transmitter antenna, at least one transverse transmitter antenna at least one axial receiver antenna, and at least one transverse receiver antenna is rotated in a subterranean wellbore. Electromagnetic voltage measurements are acquired from the axial and transverse receiver antennas while rotating. The acquired voltage measurements are processed to compute harmonic voltage coefficients. Ratios of selected ones of the harmonic voltage coefficients are in turn processed to compute at least one gain compensated quantity including an axial cross term.

The disclosed methodology provides a method for obtaining a gain compensated three-dimensional matrix of measurements using orthogonal antennas. The acquired measurements are fully gain compensated and independent of antenna tilt angle variation. Moreover, the disclosed method and apparatus tends to be insensitive to bending and alignment angle errors.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 3A, 3B, 3C, and 3D (collectively FIG. 3) depict the antenna moments for various example transmitter and receiver configurations for obtaining gain compensated axial cross term quantities.

FIG. 4 depicts a flow chart of one disclosed method embodiment for obtaining gain compensated axial cross term quantities.

FIGS. 5A and 5B (collectively FIG. 5) depict the antenna moments for various example transmitter and receiver configurations for obtaining gain compensated symmetrized and anti-symmetrized quantities.

DETAILED DESCRIPTION

Figure 1:
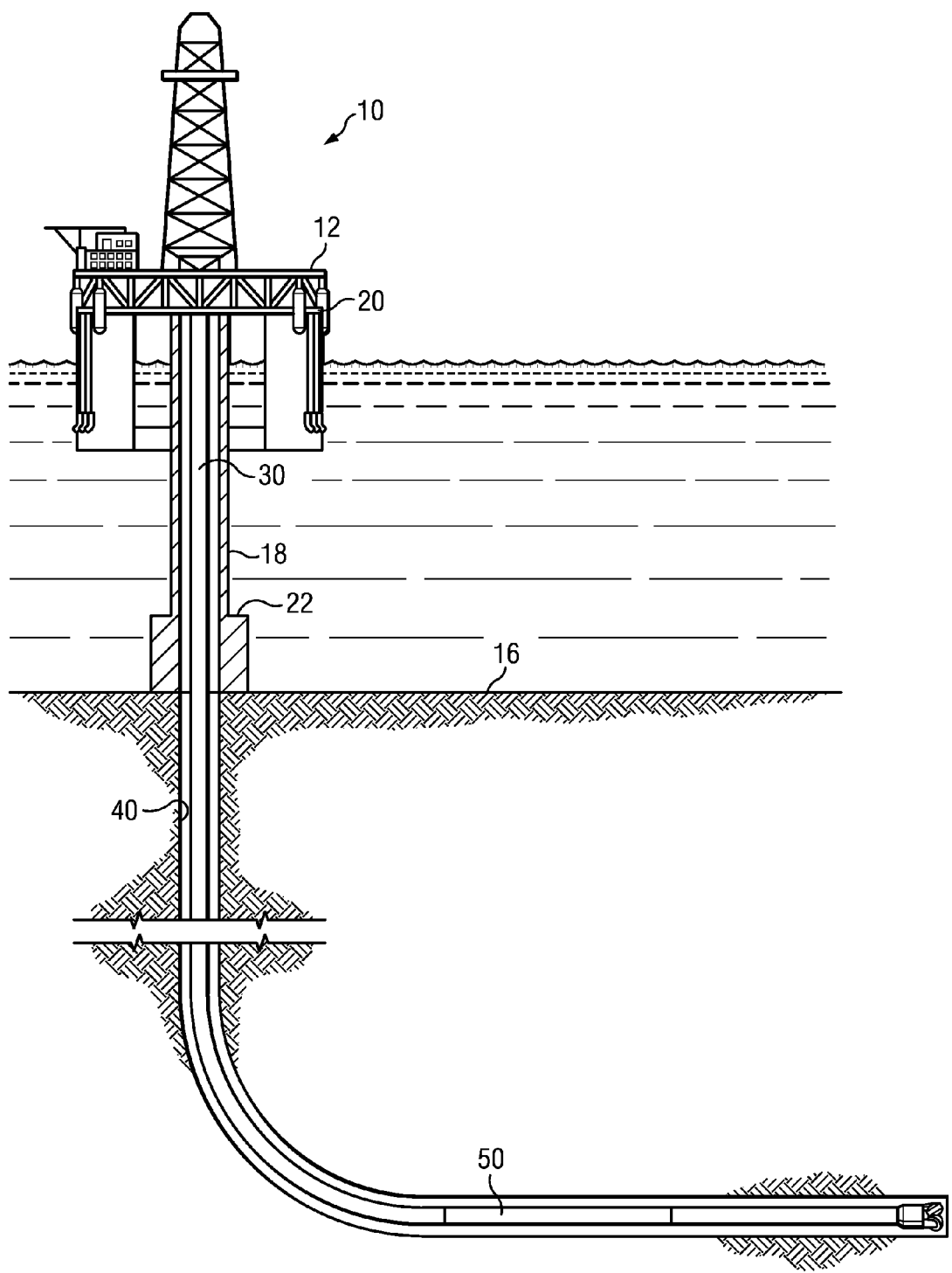
FIG. 1 depicts one example of a drilling rig on which the disclosed electromagnetic logging methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make directional electromagnetic logging measurements. As described in more detail below the electromagnetic measurement tool 50 may include multiple orthogonal antennas deployed on a logging while drilling tool body.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
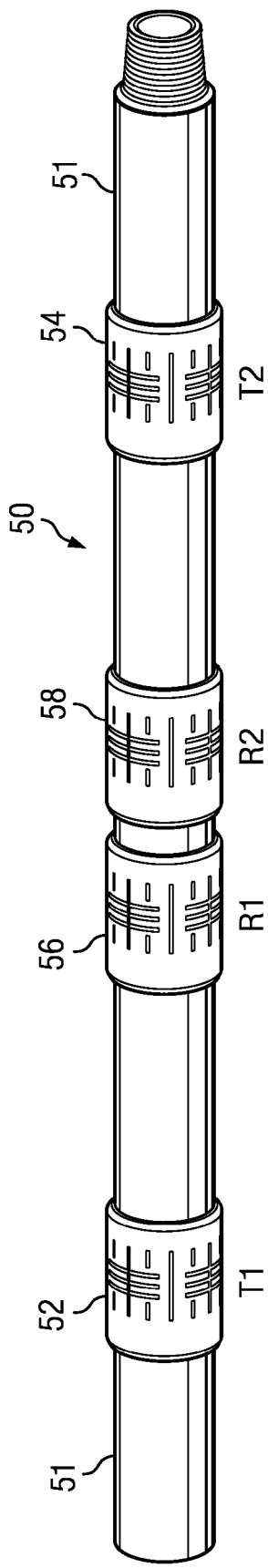
FIG. 2A depicts one example of the electromagnetic logging tool shown on FIG. 1.

FIG. 2A depicts one example of an electromagnetic measurement tool 50. In the depicted embodiment measurement tool 50 includes first and second axially spaced transmitters 52 and 54 and first and second axially spaced receivers 56 and 58 deployed on a logging while drilling tool body 51, with the receivers 56 and 58 being deployed axially between the transmitters 52 and 54. As described in more detail below, each of the transmitters 52 and 54 and receivers 56 and 58 includes at least one transverse antenna and may further include an axial antenna. For example, the transmitters and receivers may include a bi-axial antenna arrangement including an axial antenna and a transverse (cross-axial) antenna. In another embodiment, the transmitters and receivers may include a tri-axial antenna arrangement including an axial antenna and first and second transverse antennas that are orthogonal to one another. As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

Figure 2B:
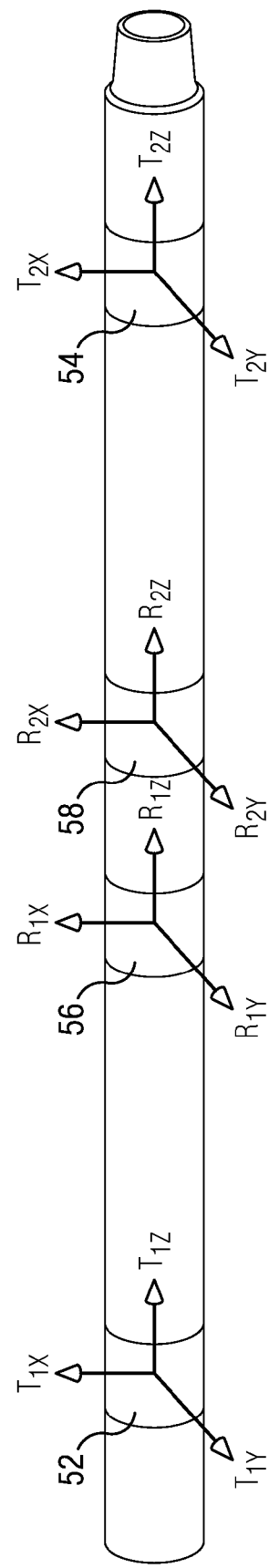
FIG. 2B schematically depicts the antenna moments in an electromagnetic logging tool including triaxial transmitters and receivers.

FIG. 2B depicts the moments (magnetic dipoles) of one embodiment of measurement tool 50 in which the transmitters 52, 54 and receivers 56, 58 each include a tri-axial antenna arrangement. Each of the transmitters 52, 54 includes an axial antenna $T1_z$ and $T2_z$ and first and second transverse antennas $T1_x$, $T1_y$ and $T2_x$, $T2_y$. Likewise, each of the receivers 56, 58 includes an axial antenna R1, and R2, and first and second transverse antennas $R1_x$, $R1_y$ and $R2_x$, $R2_y$. It will be understood that the disclosed embodiments are not limited to a tri-axial antenna configuration such as that depicted on FIG. 2B.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae can be processed, as is known to those of ordinary skill in the art, to obtain one or more properties of the formation.

In general the earth is anisotropic such that its electrical properties may be expressed as a three-dimensional tensor that contains information on formation resistivity anisotropy, dip, bed boundaries and other aspects of formation geometry. It will be understood by those of ordinary skill in the art that the mutual couplings between the tri-axial transmitter antennas and the tri-axial receiver antennas depicted on FIG. 2B form a three-dimensional matrix and thus may have sensitivity to a full three-dimensional formation impedance tensor. For example, a three-dimensional matrix of measured voltages V may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the three-dimensional matrix of measured voltages with i indicating the corresponding transmitter triad (e.g., T1 or T2) and j indicating the corresponding receiver triad (e.g., R1 or R2), $I_i$ represent the transmitter currents, and $Z_{ij}$ represent the transfer impedances which depend on the electrical and magnetic properties of the environment surrounding the antenna pair in addition to the frequency, geometry, and spacing of the antennas. The third and fourth subscripts indicate the axial orientation of the transmitter and receiver antennas. For example, $V_{12xy}$ represents a voltage measurement on the y-axis antenna of receiver R2 from a firing of the x-axis antenna of transmitter T1.

When bending of the measurement tool is negligible (e.g., less than about 10 degrees), the three dimensional voltage matrix may be modeled mathematically, for example, as follows:

$$V_{ij} = G_{Ti}(R_\theta{}^t Z_{ij} R_\theta) G_{Rj} \quad (2)$$

where $Z_{ij}$ represent the transfer impedances as described above, $G_{Ti}$ and $G_{Rj}$ are diagonal matrices representing the transmitter and receiver gains, $R_\theta$ represents the rotation matrix about the z-axis through angle θ, and the superscript t represents the transpose of the corresponding matrix. The gain and rotation matrices in Equation 2 may be given, for example, as follows:

$$G_{Ti} = \begin{bmatrix} g_{Tix} & 0 & 0 \\ 0 & g_{Tiy} & 0 \\ 0 & 0 & g_{Tiz} \end{bmatrix} \quad (3)$$

$$G_{Rj} = \begin{bmatrix} g_{Rjx} & 0 & 0 \\ 0 & g_{Rjy} & 0 \\ 0 & 0 & g_{Rjz} \end{bmatrix} \quad (4)$$

$$R_\theta = \begin{bmatrix} \cos(\theta) & -\sin(\theta) & 0 \\ \sin(\theta) & \cos(\theta) & 0 \\ 0 & 0 & 1 \end{bmatrix} \quad (5)$$

The rotated couplings (shown in the parentheses in Equation 2) may be expressed mathematically in harmonic form, for example, as follows:

$$R_\theta^t Z_{ij} R_\theta = Z_{DC\_ij} = Z_{FHC\_ij} \cos(\theta) = Z_{FHS\_ij} \sin(\theta) + Z_{SHC\_ii} \cos(2\theta) + Z_{SHS\_ij} \sin(2\theta) \quad (6)$$

where $Z_{DC\_ij}$ represents a DC (average) coupling coefficient, $Z_{FHC\_ij}$ and $Z_{FHC\_ij}$ represent first order harmonic cosine and first order harmonic sine coefficients, and $Z_{SHC\_ij}$ and $Z_{SHS\_ij}$ represent second order harmonic cosine and second order harmonic sine coefficients of the ij transmitter receiver couplings. These coefficients are shown below:

$$Z_{DC\_ij} = \begin{bmatrix} \dfrac{Z_{ijxx} + Z_{ijyy}}{2} & \dfrac{(Z_{ijxy} - Z_{ijyx})}{2} & 0 \\ -\dfrac{(Z_{ijxy} - Z_{ijyx})}{2} & \dfrac{Z_{ijxx} + Z_{ijyy}}{2} & 0 \\ 0 & 0 & Z_{ijzz} \end{bmatrix}$$

$$Z_{FHC\_ij} = \begin{bmatrix} 0 & 0 & Z_{ijxz} \\ 0 & 0 & Z_{ijyx} \\ Z_{ijzx} & Z_{ijzy} & 0 \end{bmatrix}$$

$$Z_{FHS\_ij} = \begin{bmatrix} 0 & 0 & Z_{ijxz} \\ 0 & 0 & -Z_{ijxz} \\ Z_{ijzy} & -Z_{ijzx} & 0 \end{bmatrix}$$

$$Z_{SHC\_ij} = \begin{bmatrix} \dfrac{Z_{ijxx} - Z_{ijyy}}{2} & \dfrac{(Z_{ijxy} + Z_{ijyx})}{2} & 0 \\ \dfrac{(Z_{ijxy} + Z_{ijyx})}{2} & -\dfrac{(Z_{ijxx} - Z_{ijyy})}{2} & 0 \\ 0 & 0 & 0 \end{bmatrix}$$

$$Z_{SHS_{ij}} = \begin{bmatrix} \dfrac{(Z_{ijxy} + Z_{ijyx})}{2} & -\dfrac{(Z_{ijxx} - Z_{ijyy})}{2} & 0 \\ -\dfrac{(Z_{ijxx} - Z_{ijyy})}{2} & -\dfrac{(Z_{ijxy} + Z_{ijyx})}{2} & 0 \\ 0 & 0 & 0 \end{bmatrix} \quad (7)$$

In general, the receiving antenna voltages are measured while the tool rotates in the borehole. Following the form of Equation 6, the measured voltages may be expressed mathematically in terms of its harmonic voltage coefficients, for example, as follows thereby enabling the harmonic voltage coefficients to be obtained:

$$V_{ij} = V_{DC\_ij} + V_{FHC\_ij} \cos(\theta) + V_{FHS\_ij} \sin(\theta) + V_{SHC\_ij} \cos(2\theta) + V_{SHS\_ij} \sin(2\theta) \quad (8)$$

wherein where $V_{DC\_ij}$ represents a DC voltage coefficient, $V_{FHC\_ij}$ and $V_{FHS\_ij}$ represent first order harmonic cosine and first order harmonic sine voltage coefficients (also referred to herein as first harmonic cosine and first harmonic sine voltage coefficients), and $V_{SHC\_ij}$ and $V_{SHS\_ij}$ represent second order harmonic cosine and second order harmonic sine voltage coefficients (also referred to herein as second harmonic cosine and second harmonic sine voltage coefficients) of the ij transmitter receiver couplings.

Gain Compensated Axial Cross Terms

It will be understood that collocated tri-axial transmitter and receiver embodiments (e.g., as depicted on FIG. 2B) are not required to gain compensate certain of the three-dimensional matrix components. For example, the axial cross terms (i.e., the xz, zx, yz, and zy terms) may be gain compensated using any tool embodiment that includes an axial transmitter antenna, a transverse (cross-axial) transmitter antenna, an axial receiver antenna, and a transverse receiver antenna deployed on the tool body. These transmitter and receiver antennas may be distributed along the tool body with substantially any suitable spacing and order. Moreover, the transmitter antennas and/or the receiver antennas may be collocated. The disclosed embodiments are not limited to any particular transmitter and receiver antenna configuration so long as the tool includes at least one axial transmitter antenna, at least one transverse transmitter antenna, at least one axial receiver antenna, and at least one transverse receiver antenna.

FIGS. 3A, 3B, 3C, and 3D (collectively FIG. 3) depict the antenna moments for various example transmitter and receiver configurations for obtaining gain compensated axial cross terms (also referred to herein as axial cross coupling impedances). FIG. 3A depicts an example tool embodiment 60 including a transmitter T axially spaced apart from a receiver R. The transmitter T includes collocated axial and transverse transmitting antennas having moments $T_z$ and $T_x$. The receiver R includes collocated axial and transverse receiving antennas having moments $R_z$ and $R_x$.

FIG. 3B depicts an alternative tool embodiment 65 that is similar to tool embodiment 60 in that it also includes a transmitter T including axial and transverse transmitting antennas having moments $T_z$ and $T_x$. Tool embodiment 65 differs from tool embodiment 60 in that the axial and transverse receiving antennas $R_z$ and $R_x$ are not collocated, but are axially spaced apart from one another on the tool body.

FIG. 3C depicts another alternative tool embodiment 70 that is similar to tool embodiment 60 in that it also includes a receiver R including axial and transverse receiving antennas having moments $R_z$ and $R_x$. Tool embodiment 70 differs from tool embodiment 60 in that the axial and transverse transmitting antennas $T_z$ and $T_x$ are not collocated, but are axially spaced apart from one another on the tool body.

FIG. 3D depicts still another alternative tool embodiment 75 including axial and transverse transmitting antennas and axial and transverse receiving antennas $T_z$ and $T_x$ and $R_z$ and $R_x$. Tool embodiment 75 differs from tool embodiment 60 in that neither the transmitting antennas nor the receiving antennas are collocated, but are axially spaced apart on the tool body. It will be understood that receiver antennas are not necessarily deployed between the transmitter antennas as depicted (TRRT), but may be axially distributed in substantially any order, for example, (i) with the transmitter antennas between the receiver antennas (RTTR), (ii) with the transmitter antennas alternating with the receiver antennas (TRTR or RTRT), or (iii) with the transmitter antennas on one side and the receiver antennas on the other (TTRR or RRTT). It will thus be understood that the disclosed embodiments are not limited to collocation or non-collocation of the axial and transverse transmitting and/or receiving antennas or to any particular spacing and location thereof along the tool body.

It will further be understood that one or more of the transmitters and/or receivers in tool embodiments 60, 65, 70, and 75 may optionally further include a second transverse antenna such that the transmitter and/or receiver includes a triaxial antenna arrangement having three antennas that are arranged to be mutually independent (e.g., as in FIG. 2B).

FIG. 4 depicts a flow chart of one disclosed method embodiment 100 for obtaining one or more gain compensated axial cross terms. An electromagnetic measurement tool (e.g., one of the measurement tools depicted on FIG. 2B or FIG. 3) is rotated in a subterranean wellbore at 102. Electromagnetic measurements are acquired at 104 while the tool is rotating and processed to obtain harmonic voltage coefficients. Ratios of selected harmonic voltage coefficients may then be processed to obtain the gain compensated axial cross terms at 106.

The electromagnetic measurements may be acquired and processed to obtain harmonic voltage coefficients, for example, as describe above with respect to Equations 1 through 8. As described above, gain compensated axial cross terms may be obtained using a measurement tool including an axial transmitter antenna, a transverse transmitter antenna, an axial receiver antenna, and a transverse receiver antenna (each of the tool embodiments depicted on FIGS. 2B and 3A-3D include such axial and transverse transmitter and receiver antennas).

The measured voltages may be related to the impedances between the transmitter and receiver antennas as described above. The DC, first harmonic cosine, and first harmonic sine voltage coefficients may be expressed, for example, as follows in terms of the couplings and the respective transmitter and receiver gains:

$$V_{DC\_xx} = g_{Tx} g_{Rx} \frac{Z_{xx} + Z_{yy}}{2}$$

$$V_{DC\_zz} = g_{Tz} g_{Rz} Z_{zz}$$

$$V_{FHC\_xz} = g_{Tx} g_{Rx} Z_{xz}$$

$$V_{FHC\_zx} = g_{Tz} g_{Rx} Z_{zx}$$

$$V_{FHS\_xz} = g_{Tx} g_{Rz} Z_{yz}$$

$$V_{FHS\_zx} = g_{Tz} g_{Rx} Z_{xy} \quad (9)$$

where $g_{Tz}$ and $g_{Tx}$ represent the gains of the axial and transverse transmitter antennas, $g_{Rz}$ and $g_{Rx}$ represent the gains of the axial and transverse receiver antennas, $V_{DC\_xx}$ is the DC voltage obtained from the x directed receiver when the x directed transmitter fires, $V_{DC\_zz}$ is the DC voltage obtained from the z directed receiver when the z directed transmitter fires, $V_{FHC\_xz}$ ($V_{FHS\_xz}$) is the first harmonic cosine (sine) voltage obtained from the z directed receiver when the x directed transmitter fires, and $V_{FHC\_zx}$ ($V_{FHS\_zx}$) is the first harmonic cosine (sine) voltage obtained from the x directed receiver when the z directed transmitter fires.

Selected ratios of the DC, first harmonic cosine, and first harmonic sine voltage coefficients given in Equation 9 may be processed at 106 to compute the gain compensated axial cross terms. For example, a gain compensated quantity (ratio) related to the xz and/or the zx cross coupling impedances may be computed by processing a ratio of a product of the first harmonic cosine coefficients of the cross-coupling terms to a product of the DC coefficients of the direct coupling terms. Likewise, a gain compensated quantity (ratio) related to the yz and/or the zy cross coupling impedances may be computed by processing a ratio of a product of the first harmonic sine coefficients of the cross-coupling terms to a product of the DC coefficients of the direct coupling terms. It will be understood that the xz, zx, yz, and zy cross coupling impedances are also referred to herein as couplings. Such ratios may be expressed mathematically in general terms (for example for the configuration shown on FIG. 3A) as follows:

$$CRxz = \frac{V_{FHC\_zx} \cdot V_{FHC\_xz}}{V_{DC\_xx} \cdot V_{DC\_zz}} = \frac{2 Z_{zx} Z_{xz}}{Z_{zz}(Z_{xx}+Z_{yy})}$$

$$CRyz = \frac{V_{FHS\_zx} \cdot V_{FHS\_xz}}{V_{DC\_xx} \cdot V_{DC\_zz}} = \frac{2 Z_{zy} Z_{yz}}{Z_{zz}(Z_{xx}+Z_{yy})} \quad (10)$$

where CRxz and CRyz represent the gain compensated quantities (ratios). Note that the transmitter and receiver gains are fully canceled in Equation 10 resulting in the computed quantities being fully gain compensated.

The following discussion makes use of the notation and the antenna spacing described above with respect to FIG. 2B, although it will be understood that the disclosed embodiments are not so limited. As described above, the axial cross term voltages (the xz, zx, yz, and zy terms) may be fully gain compensated using any tool embodiment that includes an axial transmitter antenna, a transverse transmitter antenna, an axial receiver antenna, and a transverse receiver antenna.

It will be understood that in general $Z_{TR} = Z_{TR}^t$. For example, the impedances $Z_{12zx}$ and $Z_{21xz}$ are identically equal in a homogeneous anisotropic medium. These impedances are only approximately equal in a heterogeneous medium (e.g., in the presence of bed boundaries) since the transmitter-receiver pairs 12zx and 21xz are not exactly located at the same points in space. A gain compensated quantity CZX that has the characteristics of a zx tensor coupling element may be obtained, for example, as given in the following equations:

$$CZX = \sqrt{\frac{V_{FHC\_12zx} \cdot V_{FHC\_21xz}}{V_{DC\_22xx} \cdot V_{DC\_11zz}}} \approx \sqrt{\frac{2 Z_{zx} Z_{zy}}{Z_{zz}(Z_{xx}+Z_{yy})}}$$

$$CZX = \sqrt{\frac{V_{FHC\_11zx} \cdot V_{FHC\_22xz}}{V_{DC\_21xx} \cdot V_{DC\_12zz}}} \approx \sqrt{\frac{2 Z_{zx} Z_{zx}}{Z_{zz}(Z_{xx}+Z_{yy})}} \quad (11)$$

Likewise a gain compensated quantity CZY that has the characteristics of a zy tensor coupling element may be obtained, for example, as given in the following equations:

$$CZY = \sqrt{\frac{V_{FHS\_12zx} \cdot V_{FHS\_21xz}}{V_{DC\_22xx} \cdot V_{DC\_11zz}}} \approx \sqrt{\frac{2 Z_{zy} Z_{zy}}{Z_{zz}(Z_{xx}+Z_{yy})}}$$

$$CZY = \sqrt{\frac{V_{FHS\_11zx} \cdot V_{FHS\_22xz}}{V_{DC\_21xx} \cdot V_{DC\_12zz}}} \approx \sqrt{\frac{2 Z_{zy} Z_{zy}}{Z_{zz}(Z_{xx}+Z_{yy})}} \quad (12)$$

A gain compensated quantity CXZ that has the characteristics of a xz tensor coupling element may be obtained, for example, as given in the following equations:

$$CXZ = \sqrt{\frac{V_{FHC\_21zx} \cdot V_{FHC\_12xz}}{V_{DC\_11xx} \cdot V_{DC\_22zz}}} \approx \sqrt{\frac{2 Z_{xz} Z_{xz}}{Z_{zz}(Z_{xx}+Z_{yy})}}$$

$$CXZ = \sqrt{\frac{V_{FHC\_22zx} \cdot V_{FHC\_11xz}}{V_{DC\_12xx} \cdot V_{DC\_21zz}}} \approx \sqrt{\frac{2 Z_{xz} Z_{xz}}{Z_{zz}(Z_{xx}+Z_{yy})}} \quad (13)$$

Likewise a gain compensated quantity CYZ that has the characteristics of a yz tensor coupling element may be obtained, for example, as given in the following equations:

$$CYZ = \sqrt{\frac{V_{FHS\_21zx} \cdot V_{FHS\_12xz}}{V_{DC\_11xx} \cdot V_{DC\_22zz}}} \approx \sqrt{\frac{2 Z_{yz} Z_{yz}}{Z_{zz}(Z_{xx}+Z_{yy})}}$$

$$CYZ = \sqrt{\frac{V_{FHS\_11zx} \cdot V_{FHS\_22xz}}{V_{DC\_12xx} \cdot V_{DC\_21zz}}} \approx \sqrt{\frac{2 Z_{zy} Z_{zy}}{Z_{zz}(Z_{xx}+Z_{yy})}} \quad (14)$$

Gain compensated quantities may also be computed that are proportional to a product of the xz and zx terms as well a product of the yz and zy terms. For example, continuing to make use of the notation and the antenna spacing described above with respect to FIG. 2B, the gain compensated quantities CXZZX and CYZZY which are proportional to a product of the xz and zx terms and a product of the yz and zy terms may be obtained as follows:

$$CXZZX = \sqrt{\frac{V_{FHC\_ijzx} \cdot V_{FHC\_ijxz}}{V_{DC\_ijxx} \cdot V_{DC\_ijzz}}} \approx \sqrt{\frac{2Z_{xz}Z_{zx}}{Z_{zz}(Z_{xx} + Z_{yy})}}$$

$$CYZZY = \sqrt{\frac{V_{FHS\_ijzx} \cdot V_{FHS\_ijxz}}{V_{DC\_ijxx} \cdot V_{DC\_ijzz}}} \approx \sqrt{\frac{2Z_{yz}Z_{zy}}{Z_{zz}(Z_{xx} + Z_{yy})}} \quad (15)$$

Gain compensated quantities which are related to an xz zx product and a yz zy product may further be obtained as follows:

$$CXZZX = \sqrt{\frac{V_{FHC\_ijzx} \cdot V_{FHC\_iixz}}{V_{DC\_ijxx} \cdot V_{DC\_iizz}}} \approx \sqrt{\frac{2Z_{xz}Z_{zx}}{Z_{zz}(Z_{xx} + Z_{yy})}}$$

$$CYZZY = \sqrt{\frac{V_{FHS\_ijzx} \cdot V_{FHS\_iixz}}{V_{DC\_ijxx} \cdot V_{DC\_iizz}}} \approx \sqrt{\frac{2Z_{yz}Z_{zy}}{Z_{zz}(Z_{xx} + Z_{yy})}} \quad (16)$$

and:

$$CXZZX = \sqrt{\frac{V_{FHC\_iizx} \cdot V_{FHC\_jixz}}{V_{DC\_jixx} \cdot V_{DC\_iizz}}} \approx \sqrt{\frac{2Z_{xz}Z_{zx}}{Z_{zz}(Z_{xx} + Z_{yy})}}$$

$$CYZZY = \sqrt{\frac{V_{FHS\_iizx} \cdot V_{FHS\_jixz}}{V_{DC\_jixx} \cdot V_{DC\_iizz}}} \approx \sqrt{\frac{2Z_{yz}Z_{zy}}{Z_{zz}(Z_{xx} + Z_{yy})}} \quad (17)$$

It will be understood that when using the notation and antenna spacing described above with respect to FIG. 2B, (i) Equation 15 relates to a tool embodiment including collocated axial and transverse transmitter antennas and collocated axial and transverse receiver antennas, (ii) Equation 16 relates to a tool embodiment including collocated axial and transverse transmitter antennas and non-collocated axial and transverse receiver antennas, and (iii) Equation 17 relates to a tool embodiment including non-collocated axial and transverse transmitter antennas and collocated axial and transverse receiver antennas.

Table 1 lists various antenna configurations from which gain compensated axial cross terms may be obtained. For example the top entry in Column 1 has the z transmitter in the left-most position, a z receiver in the next position, an x receiver, then an x transmitter in the right-most position. Using the (approximate) symmetry $Z_{TR} = Z_{TR}^t$, each of these configurations, may have the character of a tensor component related to one of the following products: zx·zx, zx·xz, xz·zx, or xz·xz. Column 1 lists antenna combinations from which a gain compensated quantity related to the zx·zx product may be obtained. Column 2 lists antenna combinations from which a gain compensated quantity related to the xz·xz product may be obtained. Column 3 lists antenna combinations from which a gain compensated quantity related to the xz·zx product may be obtained. And column 4 lists antenna combinations from which a gain compensated quantity related to zx·xz product may be obtained. As noted above, gain compensated axial cross terms may be obtained using any tool configuration including an axial transmitter antenna, a transverse (cross-axial) transmitter antenna, an axial receiver antenna, and a transverse receiver antenna.

In Table 1 the transmitter and receiver antennas are listed from uphole to downhole positions on the tool (from left to right in the table). For example, $T_z R_z R_x T_x$ indicates an axial transmitter antenna $T_z$ located above an axial receiver antenna $R_z$ and a transverse receiver antenna $R_x$ located above a transverse transmitter antenna $T_x$. Adjacent transmitter antennas or receiver antennas may be collocated or non-collocated. In the above example, the axial receiver antenna $R_z$ and the transverse receiver antenna $R_x$ may be collocated or non-collocated such that the axial receiver antenna is above the transverse receiver antenna.

TABLE 1

| Compensated ZX | Compensated XZ | Compensated XZ · ZX | Compensated ZX · XZ |
|---|---|---|---|
| $T_z R_z R_x T_x$ | $R_x T_z T_x R_z$ | $R_z R_x T_z T_x$ | $T_z R_x T_x R_z$ |
| $T_z R_z T_x R_x$ | $R_x T_x T_z R_z$ | $R_z R_x T_x T_z$ | $T_z T_x R_z R_x$ |
| $T_z R_x R_z T_x$ | $R_x T_x R_z T_z$ | $R_z T_x R_x T_z$ | $T_z T_x R_x R_z$ |
| $R_z T_z R_x T_x$ | $T_x R_z R_x T_z$ | $R_x T_z R_z T_x$ | $T_x T_z R_z R_x$ |
| $R_z T_z T_x R_x$ | $T_x R_x T_z R_z$ | $R_x R_z T_z T_x$ | $T_x T_z R_x R_z$ |
| $R_z T_x T_z R_x$ | $T_x R_x R_z T_z$ | $R_x R_z T_x T_z$ | $T_x R_z T_z R_x$ |

It will be understood that since computation of the compensated quantities in Equations 11-17 involves taking a square root, there may be a 180 degree phase ambiguity (i.e., a sign ambiguity). As such, the gain ratios of the receivers may not be arbitrary, but should be controlled such that they are less than 180 degrees (i.e., the antenna wires should be connected to the electronics in the same way). For un-tuned receiving antennas, the electronic and antenna gain/phase mismatch (assuming the antenna wires are not flipped from one receiver to another) may generally be controlled to within about 30 degrees (particularly at the lower frequencies used for deep measurements). This is well within 180 degrees (even at elevated temperatures where the mismatch may be at its greatest).

A phase shift and attenuation may be computed for the compensated quantities listed above, for example, as follows:

$$PS \stackrel{def}{=} \frac{180}{\pi} \text{angle}(1 + CQ)$$

$$AT \stackrel{def}{=} 20\log 10(1 + CQ) \quad (18)$$

where PS represents the phase shift, AT represents attenuation, and CQ represents the compensated quantity (e.g., one of the quantities computed in Equations 11-17). These quantities may be equal to zero in simple formations. Thus, the phase shift and attenuation were computed by adding one to CQ in Equation 18.

Gain Compensated Symmetrized and Anti-Symmetrized Quantities

Symmetrized and anti-symmetrized directional resistivity quantities have been disclosed in U.S. Pat. Nos. 6,969,994 and 7,536,261 which are incorporated by reference herein in their entireties. In general, the symmetrized quantity is taken to be proportional to a difference between the xz and zx terms while the anti-symmetrized quantity is taken to be proportional to a sum of the xz and zx terms. The symmetrized measurement tends to be sensitive to bed boundaries and less sensitive to anisotropy and dip while the anti-symmetrized measurement tends to be sensitive to anisotropy and dip and less sensitive to bed boundaries.

It will be understood that a tool configuration including collocated tri-axial transmitter and receiver embodiments (e.g., as depicted on FIG. 2B) is not required to obtain gain compensated symmetrized and anti-symmetrized quantities.

Logging tool embodiments similar to those described above for obtaining gain compensated axial cross terms may be utilized. For example, FIGS. 5A and 5B (collectively FIG. 5) depict antenna moments for various example transmitter and receiver configurations for obtaining gain compensated symmetrized and anti-symmetrized quantities. FIG. 5A depicts an embodiment including an axial receiver antenna $R_z$ and a transverse receiver antenna $R_x$ deployed axially between first and second transmitters T1 and T2. Each of the transmitters includes an axial transmitter antenna $T1_z$ and $T2_z$ and a transverse transmitter antenna $T1_x$ and $T2_x$. FIG. 5B depicts an embodiment including an axial transmitter antenna $T_z$ and a transverse transmitter antenna $T_x$ deployed axially between first and second receivers R1 and R2. Each of the receivers includes an axial receiver antenna $R1_z$ and $R2_z$ and a transverse receiver antenna $R1_x$ and $R2_x$. While the embodiments depicted on FIG. 5 include non-collocated antennas it will be understood that the axial and transverse transmitter and receiver antennas may optionally be collocated.

Figure 6:
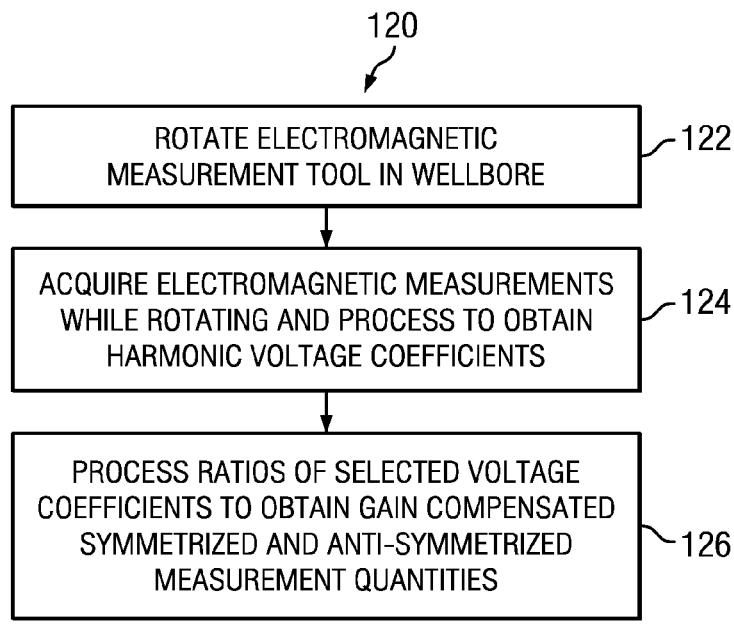
FIG. 6 depicts a flow chart of one disclosed method embodiment for obtaining gain compensated symmetrized and anti-symmetrized quantities.

FIG. 6 depicts a flow chart of one disclosed method embodiment 120 for obtaining gain compensated symmetrized and anti-symmetrized quantities. An electromagnetic measurement tool (e.g., one of the measurement tools depicted on FIG. 2B or FIG. 5) is rotated in a subterranean wellbore at 122. Electromagnetic measurements are acquired at 124 while the tool is rotating and processed to obtain harmonic voltage coefficients. Ratios of selected harmonic voltage coefficients may then be processed to obtain the gain compensated symmetrized and anti-symmetrized quantities at 126. It will be understood that the harmonic voltage coefficients may be rotated to substantially any suitable reference angle prior to computing the gain compensated quantities at 126.

A gain compensated symmetrized measurement may be obtained, for example, via subtracting CZX from CXZ (e.g., as given in Equations 11 and 13) or via subtracting CZY from CYZ (e.g., as given in Equation 12 and 14). Likewise a gain compensated anti-symmetrized measurement may be obtained, for example, via adding CZX to CXZ (e.g., as given in Equations 11 and 13) or via adding CZY to CYZ (e.g., as given in Equation 12 and 14).

Symmetrized and anti-symmetrized coupling quantities S and A may further be expressed as combinations of products of the cross terms, for example, as follows:

$$S = \sqrt{Z_{xz}^2 + Z_{zx}^2 \times 2 Z_{xz} Z_{zx}}$$

$$A = \sqrt{Z_{xz}^2 + Z_{zx}^2 + 2 Z_{xz} Z_{zx}} \qquad (19)$$

Recognizing that CZX is proportional to $Z_{zx}$ (from Equation 11), CXZ is proportional to $Z_{xz}$ (from Equation 13), and CXZZX is proportional to the square root of $Z_{xz} \cdot Z_{zx}$, gain compensated symmetrized Sc and anti-symmetrized Ac quantities may be given, for example, as follows:

$$Sc = \sqrt{CXZ^2 + CZX^2 - 2CXZZX^2}$$

$$Ac = \sqrt{CXZ^2 + CZX^2 + 2CXZZX^2} \qquad (20)$$

where CXZ, CZX, and CXZZX may be obtained for example as described above with respect to Equations 10 through 17. Equation 20 may optionally further include a scaling factor to ensure that Sc is equal to zero in a homogeneous anisoptropic medium.

Following the notation and antenna spacing described above with respect to FIG. 2B, one particular embodiment of the symmetrized and anti-symmetrized quantities may be obtained by taking the following ratios:

$$R_{zx} = \frac{V_{FHC\_12zx} \cdot V_{FHC\_21xz}}{V_{DC\_22xx} \cdot V_{DC\_11zz}} \sim Z_{zx}^2$$

$$R_{xz} = \frac{V_{FHC\_12zx} \cdot V_{FHC\_21xz}}{V_{DC\_11xx} \cdot V_{DC\_22zz}} \sim Z_{xz}^2$$

$$R1_{xzzx} = \frac{V_{FHC\_12zx} \cdot V_{FHC\_12xz}}{V_{DC\_12xx} \cdot V_{DC\_12zz}} \sim Z_{xz} Z_{zx}$$

$$R2_{xzzx} = \frac{V_{FHC\_21zx} \cdot V_{FHC\_21xz}}{V_{DC\_21xx} \cdot V_{DC\_21zz}} \sim Z_{xz} Z_{zx} \qquad (21)$$

It will be readily apparent that the ratios in Equation 21 are fully gain compensated and similar to the gain compensated quantities presented above with respect to Equations 11-17. It will be understood that corresponding ratios $R_{zy}$, $R_{yz}$, $R1_{yzzy}$, and $R2_{yzzy}$ may be computed by replacing the first harmonic cosine coefficients with corresponding first harmonic sine coefficients. These ratios may be equivalently utilized to obtain the symmetrized and anti-symmetrized quantities.

To combine the quantities in Equation 21 such that the symmetric result is zero in a homogeneous anisotropic formation may require a scaling factor. Such a scaling factor may be obtained, for example, as follows:

$$\text{scale} = \frac{V_{DC\_12zz} V_{DC\_21zz} V_{DC\_12xx} V_{DC\_21xx}}{V_{DC\_11zz} V_{DC\_22zz} V_{DC\_11xx} V_{DC\_22xx}} \qquad (22)$$

such that the fully gain compensated symmetrized and anti-symmetrized quantities may be expressed as follows:

$$Sc = \sqrt{R_{xz} + R_{zx} - \text{scale}(R1_{xzzx} + R2_{xzzx})}$$

$$Ac = \sqrt{R_{xz} + R_{zx} + \text{scale}(R1_{xzzx} + R2_{xzzx})} \qquad (23)$$

As described above with respect to Equations 11-17, taking the square root of a quantity can introduce a sign (or phase) ambiguity. Even with careful unwrapping of the phase in Equation 23, a symmetrized directional measurement Sc may have the same sign whether an approaching bed is above or below the measurement tool. The correct sign may be selected, for example, via selecting the sign of the phase or attenuation of the following relation:

$$TSD = \sqrt{R_{zx}} - \sqrt{R_{xz}} \qquad (24)$$

where $R_{zx}$ and $R_{xz}$ are given in Equation 21. Similarly the anti-symmetrized directional measurement Ac in Equation 23 has the same sign whether the dip azimuth of the anisotropy is less than 180 degrees or greater than 180 degrees. This sign ambiguity may be resolved, for example, by taking the sign of the phase or attenuation of the following relation.

$$TAD = \sqrt{R_{zx}} + \sqrt{R_{xz}} \qquad (25)$$

The symmetrized and anti-symmetrized measurements may now be re-defined, for example, as follows to eliminate the sign ambiguity.

$$Sc \stackrel{\text{def}}{=} \frac{2\text{sign}(\text{angle}(TSD))}{\sqrt{R_{zx} + R_{xz} - \text{scale}(R1_{xz\_zx} + R2_{xz\_zx})}}$$

$$Ac \stackrel{\text{def}}{=} \frac{2\text{sign}(\text{angle}(TAD))}{\sqrt{R_{zx} + R_{xz} + \text{scale}(R1_{xz\_zx} + R2_{xz\_zx})}} \qquad (26)$$

Symmetrized directional phase shift and attenuation measurements TDSP and TDSA may then be defined, for example, as follows:

$$TDSP \overset{def}{=} \frac{180}{\pi} \text{angle}(1 + Sc)$$

$$TDSA \overset{def}{=} 20\log 10(1 + Sc) \quad (27)$$

Likewise, anti-symmetrized directional phase shift and attenuation TDAP and TDAA measurements may also be defined, for example, as follows:

$$TDAP \overset{def}{=} \frac{180}{\pi} \text{angle}(1 + Ac)$$

$$TDAA \overset{def}{=} 20\log 10(1 + Ac) \quad (28)$$

The disclosed embodiments are now described in further detail with respect to the following non-limiting examples in FIGS. 7, 8A, 8B, 9A, 9B, 10A, and 10B. These examples are analytical (mathematical) and were computed using Equations 26-28 via software code developed using a point dipole model.

Figure 7:
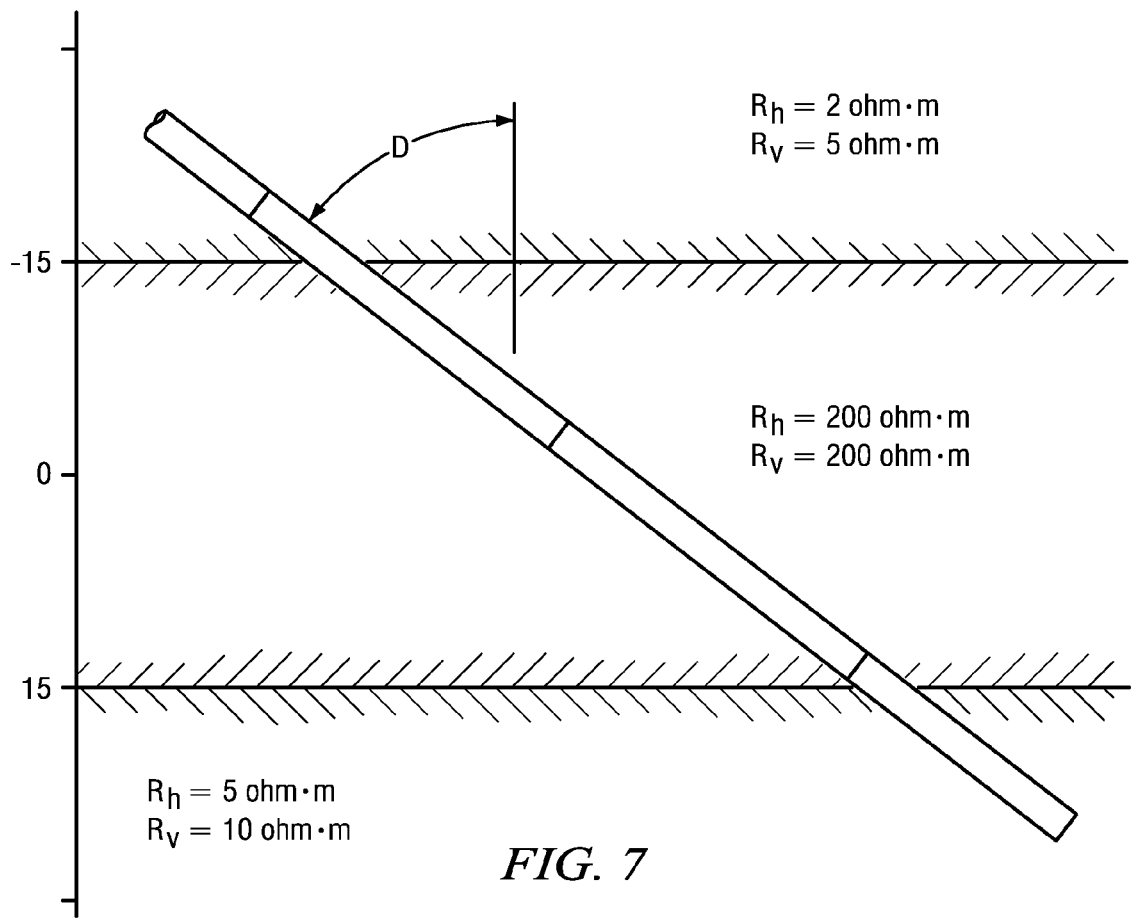
FIG. 7 depicts a three layer formation model used to evaluate the directional response of disclosed symmetrized and anti-symmetrized measurements.

FIG. 7 depicts a three layer formation model used to evaluate the response of the compensated symmetrized and anti-symmetrized measurement quantities described above with respect to Equations 27, 28, and 29. The upper layer had a horizontal resistivity of 2 ohm·m and a vertical resistivity of 5 ohm·m. The middle layer had a horizontal and vertical resistivities of 200 ohm·m while the lower layer had a horizontal resistivity of 5 ohm·m and a vertical resistivity of 10 ohm·m. The upper and lower boundaries of the middle layer were at −15 and +15 feet, respectively. The electromagnetic tool was inclined at a non-zero dip angle D. In the examples that follow (in FIGS. 8A though 10B), a tool model configuration similar to that shown on FIG. 2B was utilized. The receiver R1 and transmitter T1 were located at +13 and +40 inches with respect to the midpoint between receivers R1 and R2. The receiver R2 and the transmitter T2 were located at −13 and −40 inches. Zero depth was defined as the depth at which the midpoint between receivers R1 and R2 crossed the midpoint of the middle layer in the formation on FIG. 7.

Figure 8A:
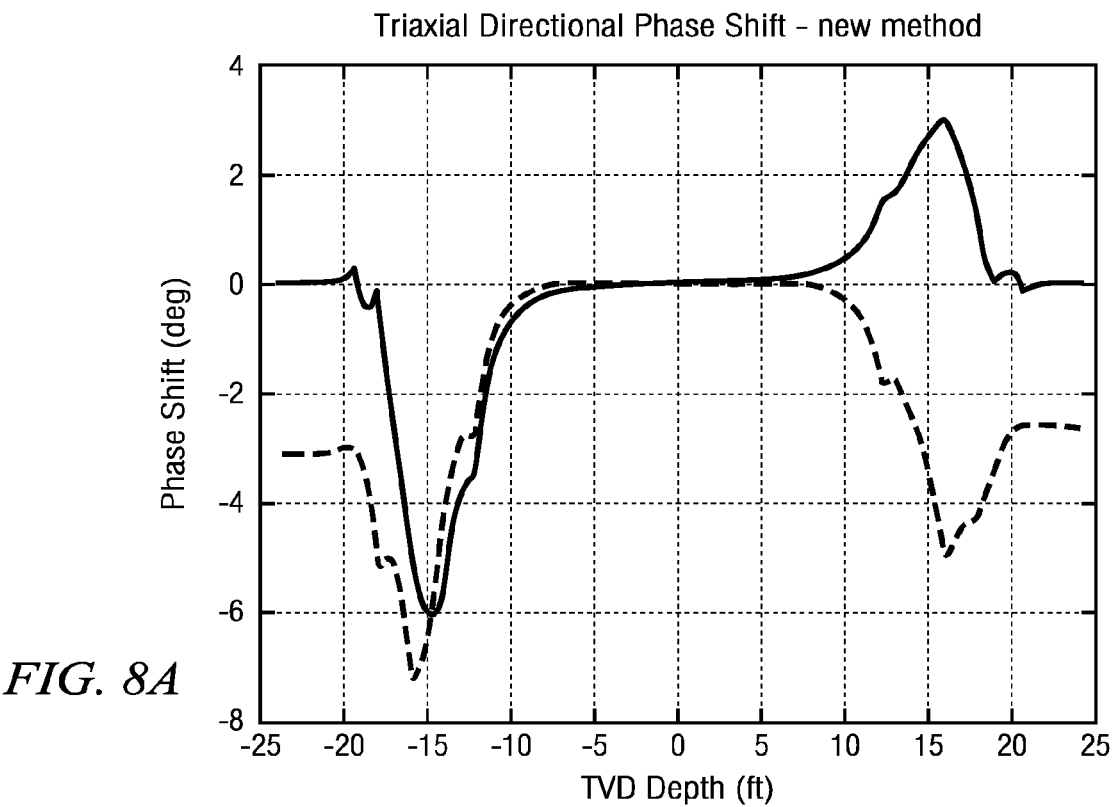
FIGS. 8A and 8B depict symmetrized and anti-symmetrized phase shift and attenuation versus total vertical depth at 30 degrees relative dip.
Figure 8B:
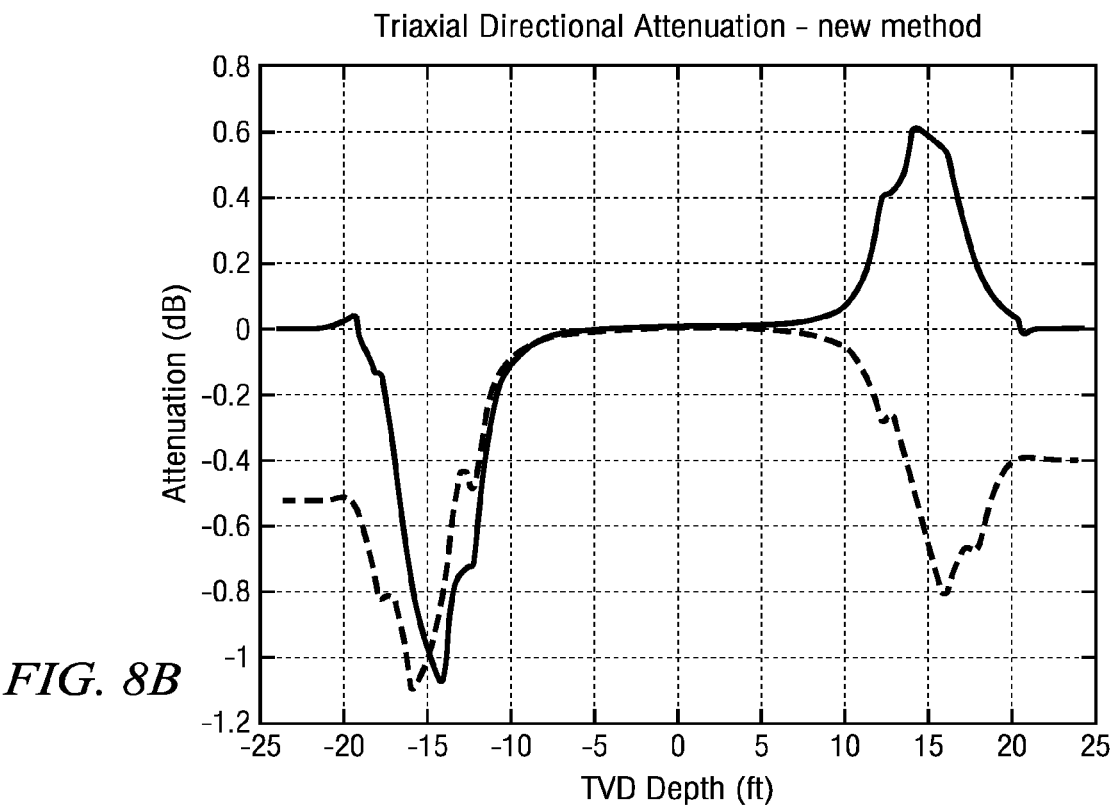
Figure 9A:
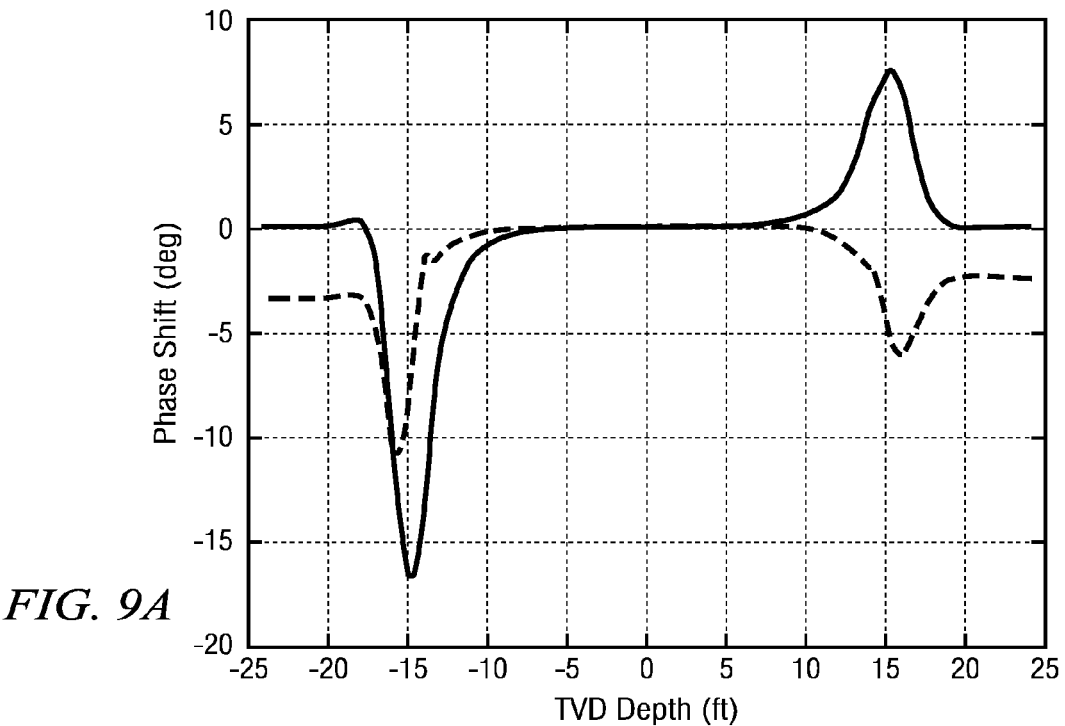
FIGS. 9A and 9B depict symmetrized and anti-symmetrized phase shift and attenuation versus total vertical depth at 70 degrees relative dip.
Figure 9B:
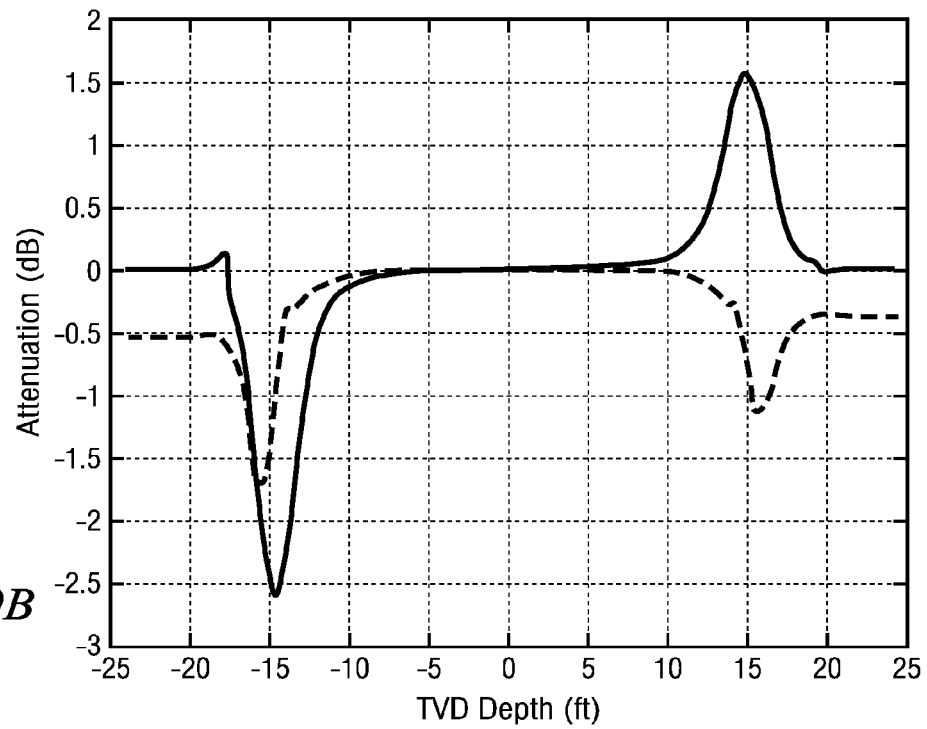
Figure 10A:
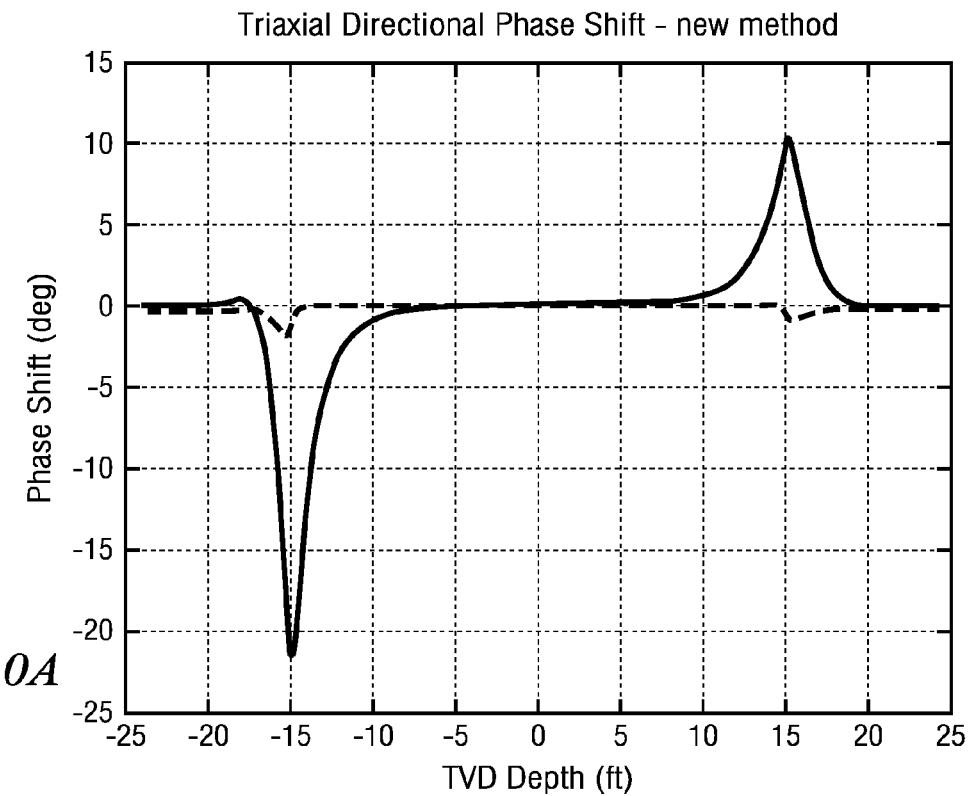
FIGS. 10A and 10B depict symmetrized and anti-symmetrized phase shift and attenuation versus total vertical depth at 88 degrees relative dip.
Figure 10B:
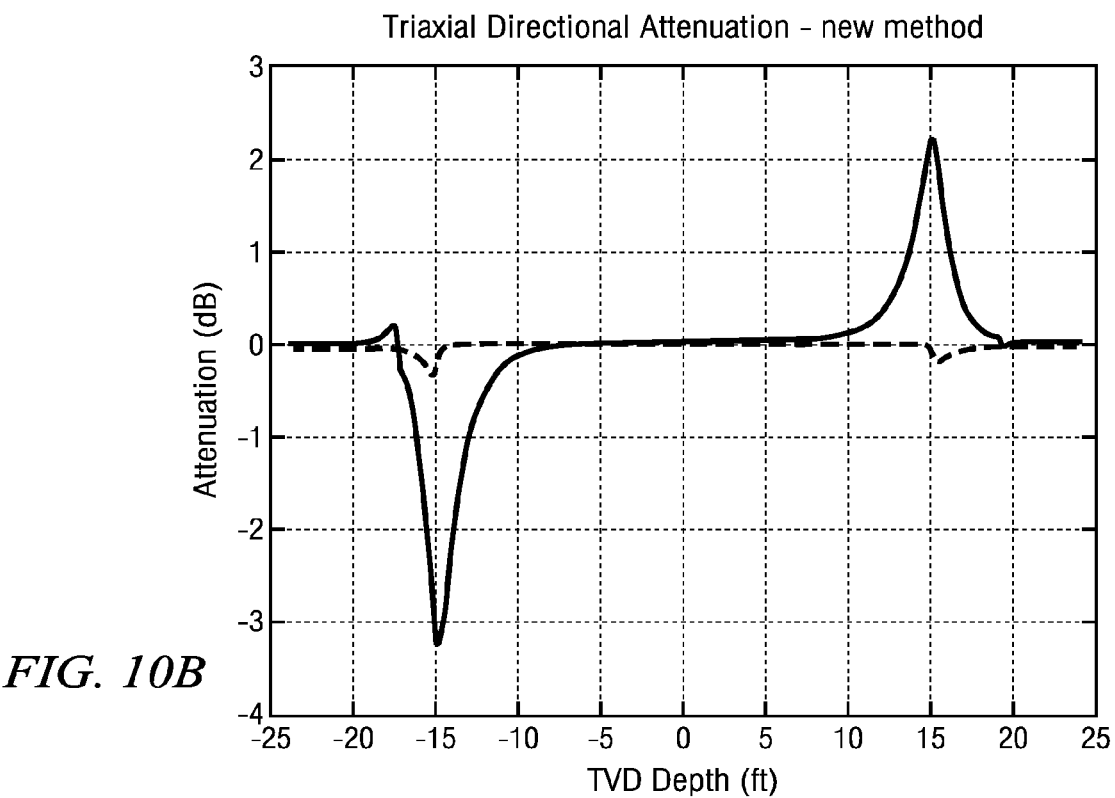

FIGS. 8A and 8B depict symmetrized and anti-symmetrized phase shift and attenuation versus total vertical depth at 30 degrees relative dip. FIGS. 9A and 9B depict symmetrized and anti-symmetrized phase shift and attenuation versus total vertical depth at 70 degrees relative dip. FIGS. 10A and 10B depict symmetrized and anti-symmetrized phase shift and attenuation versus total vertical depth at 88 degrees relative dip. These figures illustrate that the symmetrized quantity is zero away from the bed boundary. Near the boundary, the sign changes depending on whether the bed is approached from above or below. The magnitude of the symmetrized response is substantially independent of anisotropy. The anti-symmetrized quantity is sensitive to anisotropy and dip with comparatively less sensitivity to the bed boundaries.

Gain Compensated Transverse Terms

It will be understood that collocated tri-axial transmitter and receiver embodiments (e.g., as depicted on FIG. 2B) are not required to obtain gain compensated transverse terms (i.e., the xx and yy direct coupling impedances and the xy and yx cross coupling impedances). The xx and yy direct coupling impedances and the xy and yx cross coupling impedances are also referred to herein as xx, yy, xy, and yx couplings. These terms may be gain compensated, for example, using any tool embodiment that includes x- and y-axis transmitter antennas and x- and y-axis receiver antennas deployed on the tool body. These transmitter and receiver antennas may be distributed along the tool body with substantially any suitable spacing and order. Moreover, the transmitter antennas and/or the receiver antennas may optionally be collocated. The disclosed embodiments are not limited to any particular transmitter and receiver antenna configuration so long as the tool includes at least x- and y-axis transmitter antennas and x- and y-axis receiver antennas.

Figure 11A:
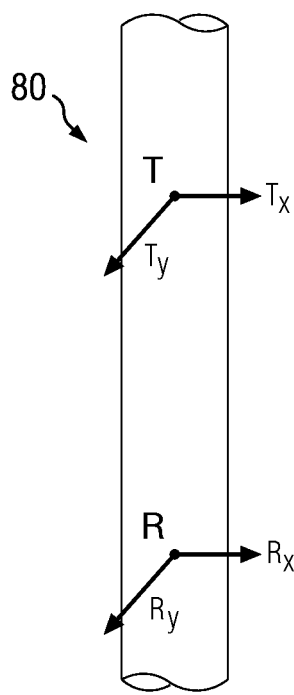
FIGS. 11A, 11B, 11C, and 11D (collectively FIG. 11) depict the antenna moments for various example transmitter and receiver configurations for obtaining gain compensated transverse coupling and cross-coupling quantities.
Figure 11C:
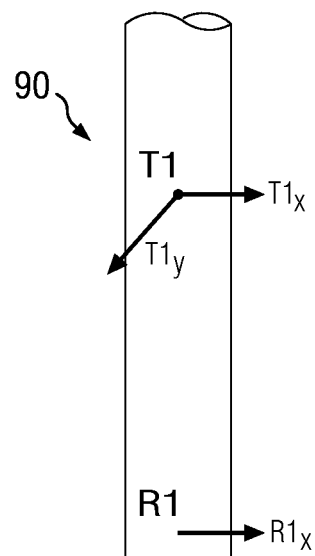
Figure 11D:
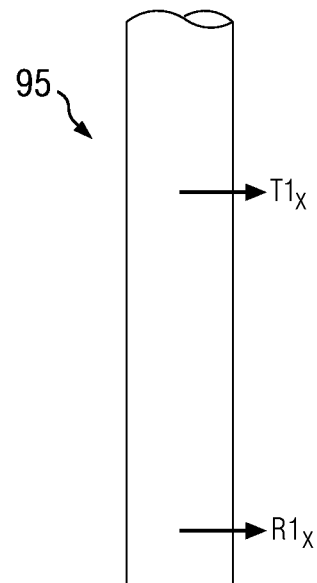
Figure 11B:
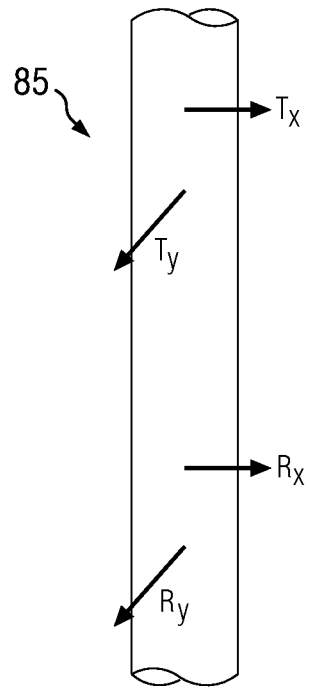

FIGS. 11A and 11B depict the antenna moments for various example transmitter and receiver configurations suitable for obtaining gain compensated xy and yx couplings. FIG. 11A depicts an example tool embodiment 80 including a transmitter T axially spaced apart from a receiver R. The transmitter T includes collocated x- and y-axis transmitting antennas having moments $T_x$ and $T_y$. The receiver R includes collocated x- and y-axis receiving antennas having moments $R_x$ and $R_y$.

FIG. 11B depicts an alternative tool embodiment 85 including x- and y-axis transmitter antennas and x- and y-axis receiver antennas $T_x$ and $T_y$ and $R_x$ and $R_y$. Tool embodiment 85 differs from tool embodiment 80 in that neither the transmitter antennas nor the receiver antennas are collocated, but are axially spaced apart on the tool body. It will be understood that the receiver antennas are not necessarily deployed between the transmitter antennas as depicted (TRRT), but may be axially distributed in substantially any order, for example, (i) with the transmitter antennas between the receiver antennas (RTTR), (ii) with the transmitter antennas alternating with the receiver antennas (TRTR or RTRT), or (iii) with the transmitter antennas on one side and the receiver antennas on the other (TTRR or RRTT). It will thus be understood that the disclosed embodiments are not limited to collocation or non-collocation of the axial and transverse transmitting and/or receiving antennas or to any particular spacing or location thereof along the tool body.

FIGS. 11C and 11D depict the antenna moments for various example transmitter and receiver configurations suitable for obtaining gain compensated xx and yy couplings and xy and yx couplings. FIG. 11C depicts another tool embodiment 90 that is similar to tool embodiment 50 shown on FIG. 2B in that it includes first and second transmitters T1 and T2 and first and second receivers R1 and R2. Tool embodiment 90 includes collocated x- and y-axis transmitters $T1_x$ and $T1_y$ and collocated x- and y-axis receivers $R2_x$ and $R2_y$. Tool embodiment 80 further includes x-axis receiver $R1_x$ and x-axis transmitter $T2_x$. FIG. 11D depicts still another alternative tool embodiment 95 including x-axis and y-axis transmitters and receivers. Tool embodiment 95 includes first and second x-axis receivers $R1_x$ and $R2_x$ deployed axially between first and second x-axis transmitters $T1_x$ and $T2_x$. Tool embodiment 95 further includes a y-axis receiver $R3_y$ deployed between the x-axis receivers and a y-axis transmitter $T4_y$.

With continued reference to FIG. 11, it will be understood that one or more or all of the transmitters and/or receivers depicted in tool embodiments 80, 85, 85, and 95 may further include axial (z-axis) antennas such that the transmitter and/or receiver includes a cross axial pair of antennas or a triaxial antenna arrangement. Moreover, one or more axial antennas may be located substantially anywhere in the depicted antenna arrays. The disclosed embodiments are not limited in regard to the inclusion or location of axial antennas.

Figure 12:
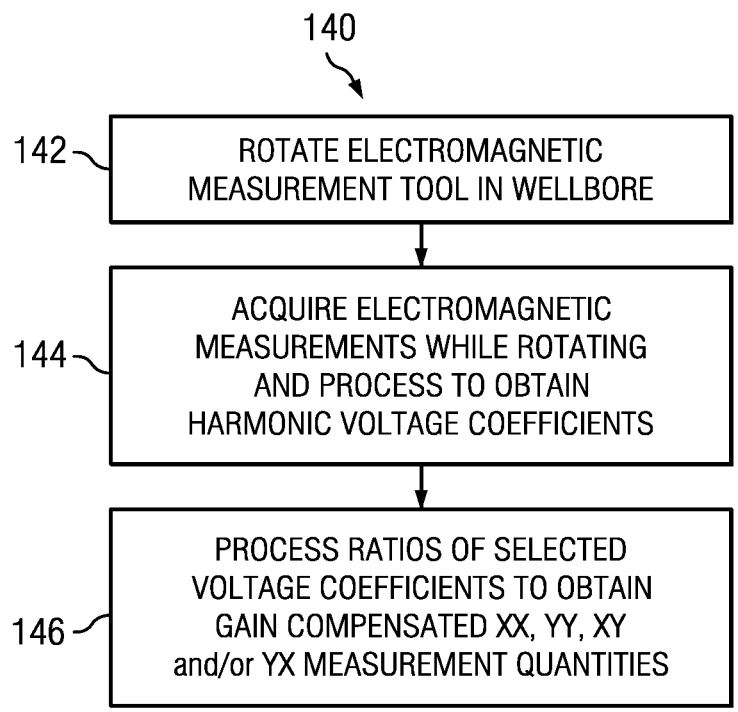
FIG. 12 depicts a flow chart of one disclosed method embodiment 140 for obtaining gain compensated transverse term quantities.

FIG. 12 depicts a flow chart of one disclosed method embodiment 140 for obtaining gain compensated transverse term quantities. An electromagnetic measurement tool (e.g., one of the measurement tools depicted on FIG. 2B or FIG. 11) is rotated in a subterranean wellbore at 142. Electromagnetic measurements are acquired at 144 while the tool is rotating and processed to obtain harmonic voltage coefficients. Ratios of selected harmonic voltage coefficients may then be processed to obtain the gain compensated transverse terms (the xx and/or yy couplings and the xy and/or yx couplings).

The electromagnetic measurements may be acquired and processed to obtain harmonic coefficients, for example, as describe above with respect to Equations 1 through 8. Following Equations 3, 4, 7, and 8 and with respect to FIG. 2B, the DC and second harmonic voltages may be expressed, for example, as follows in terms of the couplings and the respective transmitter and receiver gains.

$$V_{DC\_xx} = g_{Tx}g_{Rx}\frac{Z_{xx} + Z_{yy}}{2}$$

$$V_{DC\_xy} = g_{Tx}g_{Ry}\frac{Z_{xy} - Z_{yx}}{2}$$

$$V_{DC\_yx} = g_{Ty}g_{Rx}\frac{Z_{yx} - Z_{xy}}{2}$$

$$V_{DC\_yy} = g_{Ty}g_{Ry}\frac{Z_{xx} + Z_{yy}}{2}$$

$$V_{SHC\_xx} = g_{Tx}g_{Rx}\frac{Z_{xx} - Z_{yy}}{2}$$

$$V_{SHC\_xy} = g_{Tx}g_{Ry}\frac{Z_{xy} + Z_{yx}}{2}$$

$$V_{SHC\_yx} = g_{Ty}g_{Rx}\frac{Z_{yx} + Z_{xy}}{2}$$

$$V_{SHC\_yy} = g_{Ty}g_{Ry}\frac{Z_{yy} - Z_{xx}}{2}$$

$$V_{SHS\_xx} = g_{Tx}g_{Rx}\frac{Z_{xy} + Z_{yx}}{2}$$

$$V_{SHS\_xy} = g_{Tx}g_{Ry}\frac{Z_{yy} - Z_{xx}}{2}$$

$$V_{SHS\_yx} = g_{Ty}g_{Rx}\frac{Z_{yy} - Z_{xx}}{2}$$

$$V_{SHS\_yy} = g_{Ty}g_{Ry}\frac{-Z_{xy} - Z_{yx}}{2} \quad (29)$$

where $g_{Tx}$ and $g_{Ty}$ represent the gains of the x-axis and y-axis transmitter antennas and $g_{Rx}$ and $g_{Ry}$ represent the gains of the x-axis and y-axis receiver antennas.

Selected ratios of the DC and second harmonic voltages given in Equation 29 may be processed at 146 to compute the gain compensated quantities including the transverse terms. For example, following the notation and antenna spacing described above with respect to FIG. 2B, a gain compensated xx quantity may be computed from either the xx or yy voltage measurements as follows:

$$CXX_{xx} =$$

$$\sqrt{\frac{(V_{DC\_12xx} + V_{SHC\_12xx})(V_{DC\_21xx} + V_{SHC\_21xx})}{(V_{DC\_11xx} + V_{SHC\_11xx})(V_{DC\_22xx} + V_{SHC\_22xx})}} = \sqrt{\frac{Z_{12xx}Z_{21xx}}{Z_{11xx}Z_{11xx}}}$$

$$CXX_{yy} = \sqrt{\frac{(V_{DC\_12yy} \pm V_{SHC\_12yy})(V_{DC\_21yy} - V_{SHC\_21yy})}{(V_{DC\_11yy} \pm V_{SHC\_11yy})(V_{DC\_22yy} \pm V_{SHC\_22yy})}} = \quad (30)$$

$$\sqrt{\frac{Z_{12xx}Z_{21xx}}{Z_{11xx}Z_{11xx}}}$$

where $CXX_{xx}$ and $CXX_{yy}$ represent the gain compensated xx quantities computed from the xx and yy voltage measurements. Since these quantities are identical they may be combined (e.g., averaged) to improve the signal to noise ratio.

A gain compensated yy quantity may also be computed from either the xx or yy voltage measurements as follows:

$$CYY_{xx} =$$

$$\sqrt{\frac{(V_{DC\_12xx} - V_{SHC\_12xx})(V_{DC\_21xx} - V_{SHC\_21xx})}{(V_{DC\_11xx} - V_{SHC\_11xx})(V_{DC\_22xx} - V_{SHC\_22xx})}} = \sqrt{\frac{Z_{12yy}Z_{21yy}}{Z_{11y}Z_{11yy}}}$$

$$CYY_{yy} = \sqrt{\frac{(V_{DC\_12yy} \mp V_{SHC\_12yy})(V_{DC\_21yy} \mp V_{SHC\_21yy})}{(V_{DC\_11yy} \mp V_{SHC\_11yy})(V_{DC\_22yy} \mp V_{SHC\_22yy})}} = \quad (31)$$

$$\sqrt{\frac{Z_{12yy}Z_{21yy}}{Z_{11yy}Z_{11yy}}}$$

where $CYY_{xx}$ and $CYY_{yy}$ represent the gain compensated yy quantities computed from the xx and yy voltage measurements. These quantities are also identical and may be combined (e.g., averaged) to improve the signal to noise ratio.

Various gain compensated quantities that are combinations of the xx and yy couplings may also be computed from the xx and/or yy voltage measurements. A compensated quantity proportional to the sum of the xx and yy couplings may be computed from the xx and/or yy voltage measurements, for example, as follows:

$$CXXplusYY_{xx} =$$

$$\sqrt{\frac{V_{DC\_12xx}V_{DC\_21xx}}{V_{DC\_11xx}V_{DC\_22xx}}} = \sqrt{\frac{(Z_{12xx} + Z_{12yy})(Z_{21xx} + Z_{21yy})}{(Z_{11xx} + Z_{11yy})(Z_{22xx} + Z_{22yy})}}$$

$$CXXplusYY_{yy} = \quad (32)$$

$$\sqrt{\frac{V_{DC\_12yy}V_{DC\_21yy}}{V_{DC\_11yy}V_{DC\_22yy}}} = \sqrt{\frac{(Z_{12xx} + Z_{12yy})(Z_{21xx} + Z_{21yy})}{(Z_{11xx} + Z_{11yy})(Z_{22xx} + Z_{22yy})}}$$

where $CXXplusYY_{xx}$ and $CXXplusYY_{yy}$ represent gain compensated quantities computed from the xx and yy voltage measurements. A compensated quantity proportional to the difference between the xx and yy couplings may be computed from the xx and/or yy voltage measurements, for example, as follows:

$$CXXminusYY_{xx} =$$

$$\sqrt{\frac{V_{SHC\_12xx}V_{SHC\_21xx}}{V_{DC\_11xx}V_{DC\_22xx}}} = \sqrt{\frac{(Z_{12xx} - Z_{12yy})(Z_{21xx} - Z_{21yy})}{(Z_{11xx} + Z_{11yy})(Z_{22xx} + Z_{22yy})}}$$

$$CXXminusYY_{yy} = \quad (33)$$

$$\sqrt{\frac{V_{SHC\_12yy}V_{SHC\_21yy}}{V_{DC\_11yy}V_{DC\_22yy}}} = \sqrt{\frac{(Z_{12xx} - Z_{12yy})(Z_{21xx} - Z_{21yy})}{(Z_{11xx} + Z_{11yy})(Z_{22xx} + Z_{22yy})}}$$

where $CXXminusYY_{xx}$ and $CXXminusYY_{yy}$ represent gain compensated quantities computed from the xx and yy voltage measurements. A compensated quantity proportional to the difference between the xx and yy components may also be computed from the xx and/or yy voltage measurements, for example, as follows:

$$CXXminusYY_{ijxx} = \frac{V_{SHC\_ijxx}}{V_{DC_{ijxx}}} = \frac{(Z_{ijxx} - Z_{ijyy})}{(Z_{ijxx} + Z_{ijyy})}$$

$$CXXminusYY_{ijyy} = -\frac{V_{SHC\_ijyy}}{V_{DC\_ijyy}} = \frac{(Z_{ijxx} - Z_{ijyy})}{(Z_{ijxx} + Z_{ijyy})} \quad (34)$$

where $CXXminusYY_{ijxx}$ and $CXXminusYY_{ijyy}$ represent gain compensated quantities computed from the xx and yy voltage measurements.

Gain compensated quantities that are combinations of the xy and yx couplings may also be computed from the xx and/or yy voltage measurements. For example, a compensated quantity proportional to the sum of the xy and yx couplings may be computed from the xx and/or yy voltage measurements as follows:

$$CXYplusYX_{ijxx} = -\frac{V_{SHS\_ijxx}}{V_{DC\_ijxx}} = \frac{(Z_{ijxy} + Z_{ijyx})}{(Z_{ijxx} + z_{ijyy})} \quad (35)$$

$$CXYplusYX_{ijyy} = -\frac{V_{SHS\_ijyy}}{V_{DC\_ijyy}} = \frac{(Z_{ijxy} + Z_{ijyx})}{(Z_{ijxx} + Z_{ijyy})}$$

where $CXYplusYX_{ijxx}$ and $CXYplusYX_{ijyy}$ represent gain compensated quantities computed from the xx and yy voltage measurements. Since the first and second quantities in each of Equations 32, 33, 34, and 35 are identical they may be combined (e.g., averaged) to improve the signal to noise ratio as described above with respect to the quantities in Equations 30 and 31.

Gain compensated quantities that are combinations of the xy and yx couplings may also be computed from the xx, yy, xy, and yx voltage measurements. For example, a compensated quantity proportional to the difference between the xy and yx couplings may be computed from the xx, yy, xy, and yx voltage measurements as follows:

$$CXYminusYX_{ij} = \sqrt{\frac{V_{DC\_ijxy}V_{DC\_ijyx}}{V_{DC\_ijxx}V_{DC\_ijyy}}} = \frac{(Z_{ijxy} - Z_{ijyx})}{(Z_{ijxx} + Z_{ijyy})} \quad (36)$$

where $CXYminusYX_{ij}$ represents the gain compensated quantity. A compensated quantity proportional to the difference between the xy and yx couplings may be computed, for example, as follows:

$$CXYminusYX = \quad (37)$$

$$\sqrt{-\frac{V_{DC\_12xy}V_{DC\_21yx}}{V_{DC\_11xx}V_{DC\_22yy}}} = \sqrt{\frac{(Z_{12xy} - Z_{12yx})(Z_{21xy} - Z_{21yx})}{(Z_{11xx} + Z_{11yy})(Z_{22xx} + Z_{22yy})}}$$

The gain compensated quantities in Equations 35 and 36 may be combined to obtain gain compensated xy and yx quantities $CXY_{ij}$ and $CYX_{ij}$, for example, as follows:

$$CXY_{ij} = \frac{CXYplusYX_{ijxx} + CXYminusYX_{ij}}{2} = \frac{Z_{ijxy}}{(Z_{ijxx} + Z_{ijyy})} \quad (38)$$

$$CXY_{ij} = \frac{CXYplusYX_{ijyy} + CXYminusYX_{ij}}{2} = \frac{Z_{ijxy}}{(Z_{ijxx} + Z_{ijyy})}$$

$$CYX_{ij} = \frac{CXYplusYX_{ijxx} - CXYminusYX_{ij}}{2} = \frac{Z_{ijyx}}{(Z_{ijxx} + Z_{ijyy})}$$

$$CYX_{ij} = \frac{CXYplusYX_{ijyy} - CXYminusYX_{ij}}{2} = \frac{Z_{ijyx}}{(Z_{ijxx} + Z_{ijyy})}$$

As described above with respect to Equation 19, a phase shift and attenuation may be computed for the compensated quantities listed above, for example, as follows:

$$PS \stackrel{def}{=} \frac{180}{\pi} \text{angle}(1 + CQ) \quad (39)$$

$$AT \stackrel{def}{=} 20\log10(1 + CQ)$$

where PS represents the phase shift, AT represents attenuation, and CQ represents the compensated quantity (e.g., one of the quantities computed in Equations 30-38).

With respect to the embodiment depicted on FIG. 11D and Equation 37, a gain compensated measurement CXYminusYX sensitive to xy-yx may be obtained, for example, as follows:

$$CXYminusYX = \quad (40)$$

$$\sqrt{\frac{V_{DC\_13xy}V_{DC\_41yx}}{V_{DC\_11xx}V_{DC\_43yy}}} = \sqrt{\frac{(Z_{13xy} - Z_{13yx})(Z_{42xy} - Z_{42yx})}{(Z_{11xx} + Z_{11yy})(Z_{43xx} + Z_{43yy})}}$$

Likewise, a gain compensated measurement CXXminusYY sensitive to xx-yy may be obtained, for example, as follows:

$$CXXminusYY = \quad (41)$$

$$\sqrt{\frac{V_{SHC\_13xy}V_{SHC\_41yx}}{V_{DC\_11xx}V_{DC\_43yy}}} = \sqrt{\frac{(Z_{13xx} - Z_{13yy})(Z_{42xx} - Z_{42yy})}{(Z_{11xx} + Z_{11yy})(Z_{43xx} + Z_{43yy})}}$$

Gain Compensated Axial Term

Techniques are disclosed above for obtaining fully gain compensated quantities related to each of the eight non-axial three-dimensional impedances (i.e., the xz, zx, yz, zy, xx, yy, xy, and yx terms). A gain compensated zz (axial) coupling may be also obtained from the DC harmonic voltage coefficients, for example, as follows:

$$CZZ = \sqrt{\frac{V_{DC\_12zz}V_{DC\_21zz}}{V_{DC\_11zz}V_{DC\_22zz}}} = \sqrt{\frac{Z_{12zz}Z_{21zz}}{Z_{11zz}Z_{22zz}}} \quad (42)$$

where CZZ represents the compensated measurement (the zz direct coupling impedance). A phase shift and attenuation for CZZ may also be computed.

Gain Compensated Axial Cross Terms Using Tilted Moments

Figure 13:
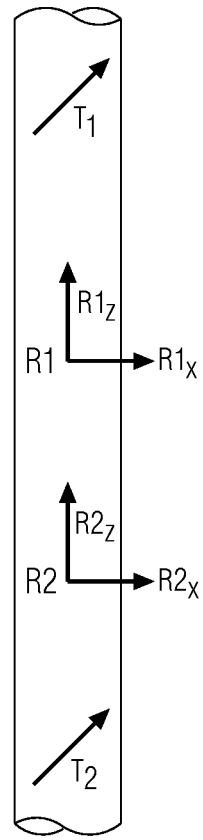
FIG. 13 depicts the antenna moments for an electromagnetic logging tool including tilted transmitters.

FIG. 13 depicts the antenna moments for an electromagnetic logging tool including tilted transmitters T1 and T2. The transmitters are deployed about axially spaced receivers R1 and R2, each of which includes collocated axial and transverse antennas $R_{1z}$, $R_{1x}$ and $R_{2z}$, $R_{2x}$. The measurement tool depicted on FIG. 13 may be used to obtain gain compensated measurements, for example, as described above with respect to FIG. 4 and Equations 10-28. For example, with respect to Equation 12, the DC and first harmonic cosine voltage coefficients may be expressed as follows:

$$V_{DC\_xx} = g_{T2}g_{R2x}\sin(\beta_{T2})\frac{Z_{xx}+Z_{yy}}{2} \quad (43)$$

$$V_{DC\_zz} = g_{T1}g_{R1z}\cos(\beta_{T1})Z_{zz}$$

$$V_{FHC\_xz} = g_{T2}g_{Rz}\sin(\beta_{T2})Z_{xz}$$

$$V_{FHC\_zx} = g_{T1}g_{Rx}\cos(\beta_{T1})Z_{zx}$$

where $\beta_{T1}$ represents the tilt angle between the T1 antenna moment and the axis of the electromagnetic measurement tool. Notice that $\sin(\beta_{T2})$ and $\cos(\beta_{T1})$ may be lumped with the transmitter gains such that $g_{T2x}=g_{T2}\sin(\beta_{T2})$ and $g_{T1z}=g_{T1}\cos(\beta_{T1})$. The sine and cosine terms thus cancel in computing the aforementioned ratios in the same way that the transmitter gains cancel. In this way any of the compensated quantities described above with respect to Equations 10-28 may be computed using a measurement tool including tilted transmitters as depicted on FIG. 13.

It will be understood that the various methods disclosed herein for obtaining fully gain compensated quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the fully gain compensated quantities may be stored in downhole memory and/or transmitted to the surface while drilling via known telemetry techniques (e.g., mud pulse telemetry or wired drill pipe). Alternatively, the harmonic fitting coefficients may be transmitted uphole and the compensated quantities may be computed at the surface using a surface processor. Whether transmitted to the surface or computed at the surface, the quantity may be utilized in an inversion process (along with a formation model) to obtain various formation parameters as described above.

Although gain compensated directional propagation measurements have been described in detail, it should be understood that various changes, substitutions and alternations can be made herein without departing from the spirit and scope of the disclosure as defined by the appended claims.

What is claimed is:

1. A method for making downhole electromagnetic logging while drilling measurements, the method comprising:
   (a) rotating an electromagnetic logging while drilling tool in a subterranean wellbore, the logging tool including at least one axial transmitter antenna, at least one transverse transmitter antenna, at least one axial receiver antenna, and at least one transverse receiver antenna;
   (b) acquiring a plurality of electromagnetic voltage measurements from the axial and transverse receiver antennas while rotating in (a);
   (c) processing the voltage measurements acquired in (b) to compute harmonic voltage coefficients;
   (d) processing a ratio of the harmonic voltage coefficients to compute at least one gain compensated quantity including at least one of an xz, zx, yx and zy value as defined in a coordinate system for the drilling tool.

2. The method of claim 1, wherein the axial cross term is an xz coupling, a zx coupling, a yz coupling, a zy coupling, or a combination thereof.

3. The method of claim 1, wherein the processing in (d) is performed by a downhole processor.

4. The method of claim 3, further comprising:
   (e) transmitting the gain compensated quantity to a surface location; and
   (f) causing a surface computer to invert the gain compensated quantity to obtain one or more properties of a subterranean formation.

5. The method of claim 1, further comprising:
   (e) processing the gain compensated quantity to compute a gain compensated phase shift and a gain compensated attenuation.

6. The method of claim 1, wherein the harmonic voltage coefficients computed in (c) comprise DC, first harmonic sine, first harmonic cosine, second harmonic sine, and second harmonic cosine voltage coefficients.

7. The method of claim 1, wherein the gain compensated quantity computed in (d) comprises at least one quantity proportional to an xz coupling, a zx coupling, a yz coupling, or a zy coupling.

8. The method of claim 7, wherein the gain compensated quantity is computed using at least one of the following mathematical equations:

$$CZX = \sqrt{\frac{V_{FHC\_12zx} \cdot V_{FHC\_21xz}}{V_{DC\_22xx} \cdot V_{DC\_11zz}}}$$

$$CZX = \sqrt{\frac{V_{FHC\_11zx} \cdot V_{FHC\_22xz}}{V_{DC\_21xx} \cdot V_{DC\_12zz}}}$$

$$CXZ = \sqrt{\frac{V_{FHC\_21zx} \cdot V_{FHC\_12xz}}{V_{DC\_11xx} \cdot V_{DC\_22zz}}}$$

$$CXZ = \sqrt{\frac{V_{FHC\_22zx} \cdot V_{FHC\_11xz}}{V_{DC\_12xx} \cdot V_{DC\_21zz}}}$$

wherein CZX represents the quantity proportional to the zx coupling, CXZ represents the quantity proportional to the xz coupling, $V_{DC\_11xx}$, $V_{DC\_12xx}$, $V_{DC\_21xx}$, $V_{DC\_22xx}$, $V_{DC\_11zz}$, $V_{DC\_12zz}$, $V_{DC\_21zz}$, and $V_{DC\_22zz}$ represent the DC voltage coefficients, and $V_{FHC\_11zx}$, $V_{FHC\_12zx}$, $V_{FHC\_21zx}$, $V_{FHC\_22zx}$, $V_{FHC\_11xz}$, $V_{FHC\_12xz}$, $V_{FHC\_21xz}$, and $V_{FHC\_22xz}$ represent the first harmonic cosine voltage coefficients.

9. The method of claim 7, wherein the gain compensated quantity is computed using at least one of the following mathematical equations:

$$CZY = \sqrt{\frac{V_{FHS\_12zx} \cdot V_{FHS\_21xz}}{V_{DC\_22xx} \cdot V_{DC\_11zz}}}$$

$$CZY = \sqrt{\frac{V_{FHS\_11zx} \cdot V_{FHS\_22xz}}{V_{DC\_21xx} \cdot V_{DC\_12zz}}}$$

$$CYZ = \sqrt{\frac{V_{FHS\_21zx} \cdot V_{FHS\_12xz}}{V_{DC\_11xx} \cdot V_{DC\_22zz}}}$$

$$CYZ = \sqrt{\frac{V_{FHS\_11zx} \cdot V_{FHS\_22xz}}{V_{DC\_12xx} \cdot V_{DC\_21zz}}}$$

wherein CZY represents the quantity proportional to the zy coupling, CYZ represents the quantity proportional to the yz coupling, $V_{DC\_11xx}$, $V_{DC\_12xx}$, $V_{DC\_21xx}$, $V_{DC\_22xx}$, $V_{DC\_11zz}$, $V_{DC\_12zz}$, $V_{DC\_21zz}$, and $V_{DC\_22zz}$ represent the DC voltage coefficients, and $V_{FHS\_11zx}$, $V_{FHS\_12zx}$, $V_{FHS\_21zx}$, $V_{FHS\_22zx}$, $V_{FHS\_11zx}$, $V_{FHS\_12zx}$, $V_{FHS\_21zx}$, and $V_{FHS\_22zx}$ represent the first harmonic sine voltage coefficients.

10. The method of claim 1, wherein the gain compensated quantity computed in (d) comprises at least one quantity proportional to a product of an xz coupling and a zx coupling or a product of a yz coupling and a zy coupling.

11. The method of claim 10, wherein the gain compensated quantity is computed using at least one of the following mathematical equations:

$$CXZZX = \sqrt{\frac{V_{FHC\_ijzx} \cdot V_{FHC\_ijxz}}{V_{DC\_ijxx} \cdot V_{DC\_ijzz}}}$$

$$CXZZX = \sqrt{\frac{V_{FHC\_ijzx} \cdot V_{FHC\_iixz}}{V_{DC\_ijxx} \cdot V_{DC\_ijiz}}}$$

$$CXZZX = \sqrt{\frac{V_{FHC\_iizx} \cdot V_{FHC\_jixz}}{V_{DC\_jixx} \cdot V_{DC\_iizz}}}$$

wherein CXZZX represents quantity proportional to the a product of the xz coupling and the zx coupling, $V_{DC\_ijxx}$, $V_{DC\_jixx}$, $V_{DC\_iizz}$, and $V_{DC\_ijzz}$, represent the DC voltage coefficients, and $V_{FHC\_iizx}$, $V_{FHC\_iixz}$, $V_{FHC\_ijzx}$, $V_{FHC\_ijxz}$, and $V_{FHC\_jixz}$ represent the first harmonic cosine voltage coefficients.

12. The method of claim 10, wherein the gain compensated quantity is computed using at least one of the following mathematical equations:

$$CYZZY = \sqrt{\frac{V_{FHS\_ijzx} \cdot V_{FHS\_ijxz}}{V_{DC\_ijxx} \cdot V_{DC\_ijzz}}}$$

$$CYZZY = \sqrt{\frac{V_{FHS\_ijzx} \cdot V_{FHS\_iixz}}{V_{DC\_ijxx} \cdot V_{DC\_iizz}}}$$

$$CYZZY = \sqrt{\frac{V_{FHS\_iizx} \cdot V_{FHS\_jixz}}{V_{DC\_jixx} \cdot V_{DC\_iizz}}}$$

wherein CYZZY represents the quantity proportional sensitive to the product of the yz coupling and the zy coupling, $V_{DC\_ijxx}$, $V_{DC\_jixx}$, $V_{DC\_iizz}$, and $V_{DC\_ijzz}$, represent the DC voltage coefficients, and $V_{FHS\_iizx}$, $V_{FHS\_iixz}$, $V_{FHS\_ijzx}$, $V_{FHS\_ijxz}$, and $V_{FHS\_jixz}$ represent the first harmonic sine voltage coefficients.

13. The method of claim 1, wherein processing the ratio in (d) comprises computing a ratio of a first product of first harmonic voltage cosine coefficients to a second product of DC voltage coefficients to compute the gain compensated quantity.

14. The method of claim 13, wherein the ratio of the first product to the second product is expressed mathematically as follows:

$$CR = \frac{V_{FHC\_zx} \cdot V_{FHC\_xz}}{V_{DC\_xx} \cdot V_{DC\_zz}}$$

wherein CR represents the ratio, $V_{FHC\_zx}$ and $V_{FHC\_xz}$ represent the first harmonic cosine coefficients, and $V_{DC\_xx}$ and $V_{DC\_zz}$ represent the DC voltage coefficients.

15. The method of claim 1, wherein processing the ratio in (d) comprises computing a ratio of a first product of first harmonic voltage sine coefficients to a second product of DC voltage coefficients to compute the gain compensated quantity.

16. The method of claim 15, wherein the ratio of the first product to the second product is expressed mathematically as follows:

$$CR = \frac{V_{FHS\_zx} \cdot V_{FHS\_xz}}{V_{DC\_xx} \cdot V_{DC\_zz}}$$

wherein CRyz represents the ratio, $V_{FHS\_zx}$ and $V_{FHS\_xz}$ represent the first harmonic sine coefficients, and $V_{DC\_xx}$ and $V_{DC\_zz}$ represent the DC voltage coefficients.

17. The method of claim 1, wherein (d) further comprises computing a square root of the ratio.

18. A method for making downhole electromagnetic logging while drilling measurements, the method comprising
(a) rotating an electromagnetic logging while drilling tool in a subterranean wellbore, the logging tool including at least one axial transmitter antenna, at least one transverse transmitter antenna, at least one axial receiver antenna and at least one transverse receiver antenna;
(b) causing the axial transmitter antenna to transmit an electromagnetic wave while rotating in (a);
(c) acquiring electromagnetic voltage measurements from the axial and transverse receiver antennas while the axial transmitter antenna is transmitting in (b);
(d) causing the transverse transmitter antenna to transmit an electromagnetic wave while rotating in (a);
(e) acquiring electromagnetic voltage measurements from the axial and transverse receiver antennas while the transverse transmitter antenna is transmitting in (d);
(f) processing the voltage measurements acquired in (b) and (d) to compute corresponding harmonic voltage coefficients;
(g) processing a ratio of the harmonic voltage coefficients computed in (f) to compute at least one gain compensated quantity including at least one of an xz, zx, yx and zy value as defined in a coordinate system for the drilling tool.

19. An electromagnetic logging while drilling tool comprising:
a logging while drilling tool body;
an axial transmitter antenna and a transverse transmitter antenna deployed on the tool body;
an axial receiver antenna and a transverse receiver antenna deployed on the tool body;
a controller configured to (i) cause the axial transmitter antenna and the transverse transmitter antenna to transmit corresponding electromagnetic waves; (ii) acquire electromagnetic voltage measurements from the axial and transverse receiver antennas while the axial transmitter antenna and the transverse transmitter antenna are transmitting; (iii) process the electromagnetic voltage measurements to compute harmonic voltage coefficients; and (iv) process a ratio of the harmonic voltage coefficients to compute at least one gain compensated quantity including at least one of an xz, zx, yx and zy value as defined in a coordinate system for the drilling tool.

20. The logging while drilling tool of claim 19, wherein the axial transmitter antenna and the transverse transmitter antenna are collocated with one another.

21. The logging while drilling tool of claim 19, wherein the axial receiver antenna and the transverse receiver antenna are collocated with one another.

22. The logging while drilling tool of claim 19, wherein the axial receiver antenna and the transverse receiver antenna are non-collocated and are deployed axially between the axial transmitter antenna and the transverse transmitter antenna.

* * * * *